US012738059B2

(12) United States Patent
Chen et al.

(10) Patent No.: US 12,738,059 B2
(45) Date of Patent: Sep. 15, 2026

(54) METHODS FOR FRAME EXTRACTION PROCESSING OF VIDEO AND FOR PLAYING VIDEO AT VARIABLE SPEEDS, VIDEO PLATFORM, AND MEDIUM

(71) Applicant: Alibaba (China) Co., Ltd., Zhejiang (CN)

(72) Inventors: Jianhua Chen, Hangzhou (CN); Yan Ye, San Diego, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 379 days.

(21) Appl. No.: 18/437,818

(22) Filed: Feb. 9, 2024

(65) Prior Publication Data

US 2024/0312211 A1 Sep. 19, 2024

(30) Foreign Application Priority Data

Mar. 16, 2023 (CN) ........................ 202310281912.X

(51) Int. Cl.
*G06V 20/40* (2022.01)
*G06V 10/77* (2022.01)

(52) U.S. Cl.
CPC .......... *G06V 20/46* (2022.01); *G06V 10/7715* (2022.01); *G06V 20/44* (2022.01)

(58) Field of Classification Search
CPC .... G06V 20/44; G06V 20/46; G06V 10/7715; H04N 19/587; H04N 21/2343
See application file for complete search history.

(56) References Cited

U.S. PATENT DOCUMENTS 7,643,422 B1 * 1/2010 Covell .................. H04L 65/613 370/235
10,116,989 B1 * 10/2018 Shen ....................... H04L 65/80
2013/0242186 A1 9/2013 Zhu

FOREIGN PATENT DOCUMENTS

CN 105933800 A 9/2016
CN 112437345 A 3/2021
CN 112866799 A 5/2021

OTHER PUBLICATIONS

Usman, et al. (A no reference method for detection of dropped video frames in live video streaming). (Year: 2016).*
Chinese Communication in Chinese Application No. 202310281912, dated Jun. 29, 2026, 6 pages.
Liu et al., "Residual Distributed Compressed Sensing for Wireless Soft Multicasting of Video Signals", Feb. 2016, pp. 15-20, vol. 38, No. 1.

* cited by examiner

*Primary Examiner* — Daniel G Mariam
(74) *Attorney, Agent, or Firm* — Finnegan, Henderson, Farabow, Garrett & Dunner, LLP

(57) ABSTRACT

A method for frame extraction processing of a video includes obtaining an encoded image of a video sequence; obtaining presentation time stamps (PTSes) and non-reference frame flags of the encoded image, wherein the encoded image has an encoding structure with time domain levels; determining frame dropping positions of the video sequence based on the time domain levels, the PTSes, and the non-reference frame flags; and performing a frame extraction operation on the video sequence based on the frame dropping positions.

20 Claims, 14 Drawing Sheets

700

METHODS FOR FRAME EXTRACTION PROCESSING OF VIDEO AND FOR PLAYING VIDEO AT VARIABLE SPEEDS, VIDEO PLATFORM, AND MEDIUM

CROSS-REFERENCE TO RELATED APPLICATIONS

The disclosure claims the benefits of priority to Chinese Application No. 202310281912.X, filed Mar. 16, 2023, which is incorporated herein by reference in its entirety.

TECHNICAL FIELD

The present disclosure generally relates to video processing, and more particularly, to a method for frame extraction processing of a video, a method and an apparatus for playing a video at variable speeds, a video platform, and a computer-readable storage medium.

BACKGROUND

In the field of video playback, videos may be played based on video players and various online video websites/applications (APPs), which generally provide a function of playing a video at variable speeds for a user. For example, a fast playback capability with variable speeds such as 1.25×, 1.5×, 2.0×, 3.0×, and 4.0× may be provided.

As videos continuously develop from standard definition to ultra-high definition, a spatial resolution develops from 720p to 4K or 8K, and a frame rate develops from 24 fps to 60 fps or 120 fps. As a speed of fast video playback increases, high requirements are imposed on a resolution and a playback frame rate. However, when a central processing unit (CPU) is used to implement software decoding or system on chip (SoC) hardware chip decoding, it is difficult to satisfy the high requirements on the resolution and the playback frame rate.

SUMMARY OF THE DISCLOSURE

Embodiments of the present disclosure provide a method for frame extraction processing of a video. The method includes obtaining an encoded image of a video sequence; obtaining presentation time stamps (PTSes) and non-reference frame flags of the encoded image, wherein the encoded image has an encoding structure with time domain levels; determining frame dropping positions of the video sequence based on the time domain levels, the PTSes, and the non-reference frame flags; and performing a frame extraction operation on the video sequence based on the frame dropping positions.

Embodiments of the present disclosure provide a method for playing a video at variable speeds. The method includes: receiving a variable-speed video playback instruction including an expected playback speed; obtaining an encoded image of a video sequence and obtaining presentation time stamps (PTSes) and non-reference frame flags of the encoded image in response to the variable-speed video playback instruction, wherein the encoded image has an encoding structure with time domain levels; determining frame dropping positions of the video sequence based on the time domain levels, the PTSes, and the non-reference frame flags; performing a frame extraction operation on the video sequence based on the frame dropping positions; and performing corresponding variable-speed playback on the video sequence after the frame extraction operation at the expected playback speed.

Embodiments of the present disclosure provide a video platform. The video platform includes a memory configured to store instructions; and one or more processors configured to execute the instructions to cause the video platform to perform operations for frame extraction processing of a video. The operations include obtaining an encoded image of a video sequence; obtaining presentation time stamps (PTSes) and non-reference frame flags of the encoded image, wherein the encoded image has an encoding structure with time domain levels; determining frame dropping positions of the video sequence based on the time domain levels, the PTSes, and the non-reference frame flags; and performing a frame extraction operation on the video sequence based on the frame dropping positions.

Embodiments of the present disclosure provide a non-transitory computer-readable storage medium that stores a set of instructions that is executable by one or more processors of a video platform to cause the video platform to perform operations for frame extraction processing of a video. The operations include obtaining an encoded image of a video sequence; obtaining presentation time stamps (PTSes) and non-reference frame flags of the encoded image, wherein the encoded image has an encoding structure with time domain levels; determining frame dropping positions of the video sequence based on the time domain levels, the PTSes, and the non-reference frame flags; and performing a frame extraction operation on the video sequence based on the frame dropping positions.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
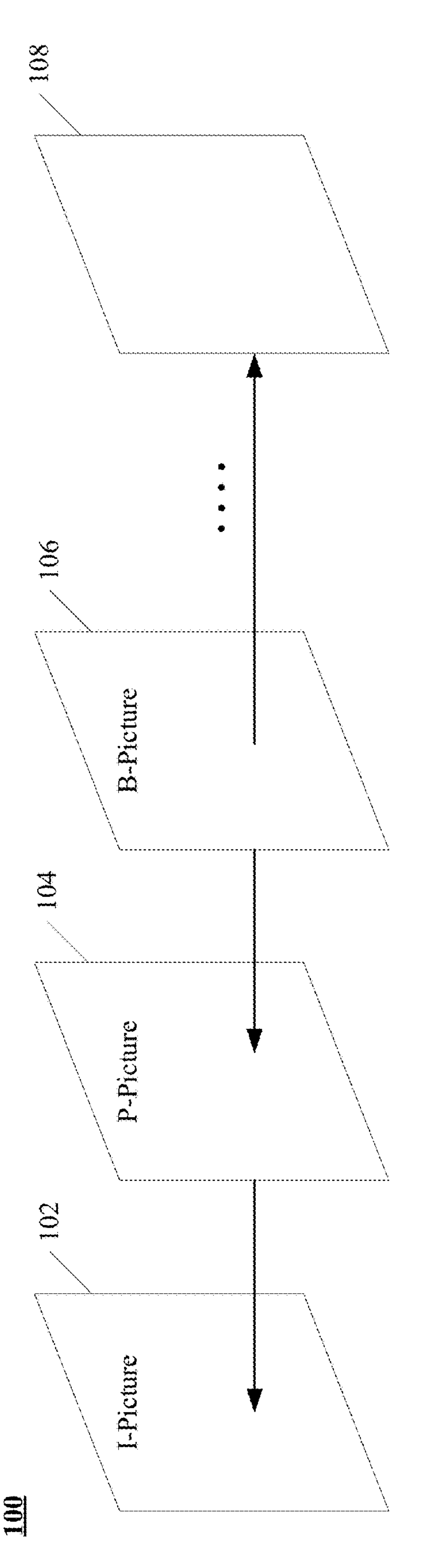
FIG. 1 is a schematic diagram illustrating structures of an exemplary video sequence, according to some embodiments of the present disclosure.
Figure 1:
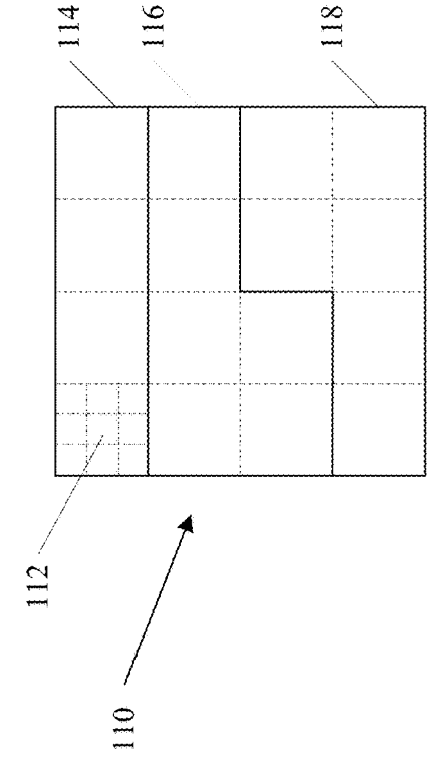

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26× series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture" or an "I-frame." A picture is referred to as a "P-picture" or a "P-frame" if some or all blocks (e.g., blocks that generally refer to portions of the video picture) in the picture are predicted using intra prediction or inter prediction with one reference picture (e.g., uni-prediction). A picture is referred to as a "B-picture" or a "B-frame" if at least one block in it is predicted with two reference pictures (e.g., bi-prediction).

FIG. 1 illustrates structures of an exemplary video sequence 100, according to some embodiments of the present disclosure. Video sequence 100 can be a live video or a video having been captured and archived. Video sequence 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
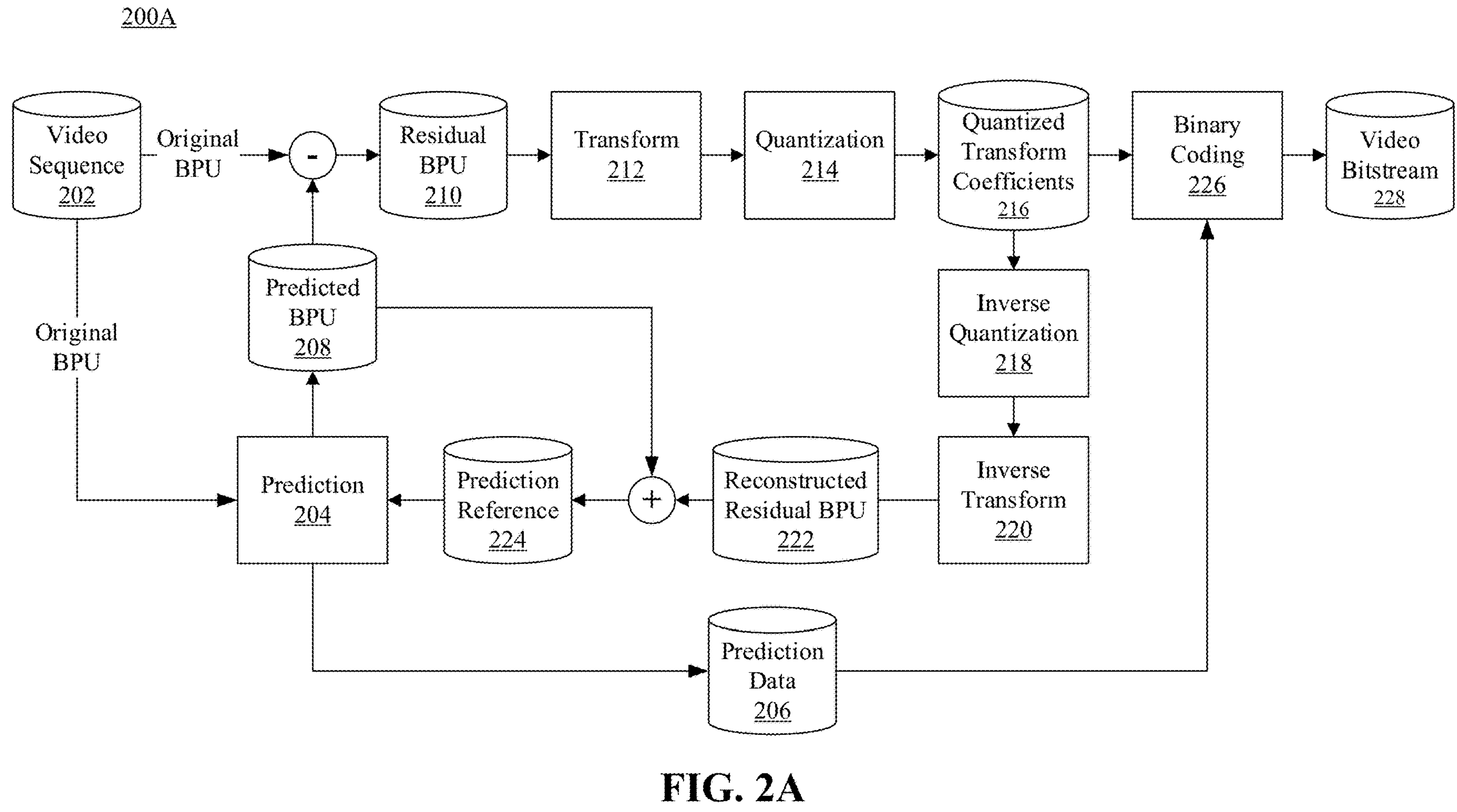
FIG. 2A is a schematic diagram illustrating an exemplary encoding process of a hybrid video coding system, consistent with embodiments of the disclosure.
Figure 2B:
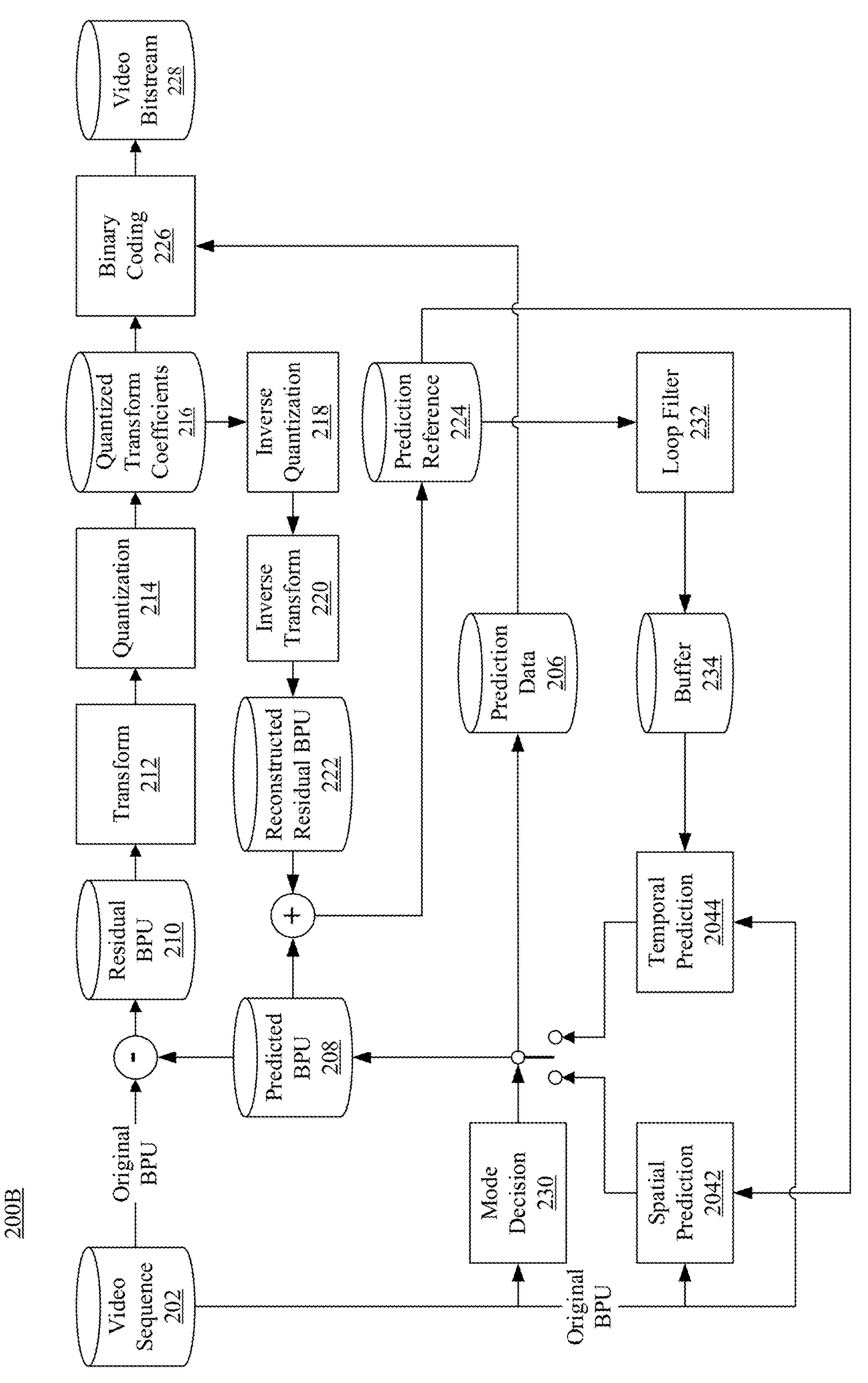
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIG. 2A and FIG. 2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an exemplary encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor")

and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization syntax element or any other syntax element of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, syntax elements of the prediction operation, a transform type at transform stage 212, syntax elements of the quantization process (e.g., quantization syntax elements), an encoder control syntax element (e.g., a bitrate control syntax element), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another exemplary encoding process 200B, consistent with embodiments of the disclosure. Process 200B can be modified from process 200A. For example, process 200B can be used by an encoder conforming to a hybrid video coding standard (e.g., H.26× series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, syntax elements of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer (DPB)") for later use (e.g., to be used as an inter-prediction reference picture for a future picture of video sequence 202). The encoder can store one or more reference pictures in buffer 234 to be used at temporal prediction stage 2044. In some embodiments, the encoder can encode syntax elements of the loop filter (e.g., a loop filter strength) at binary coding stage 226, along with quantized transform coefficients 216, prediction data 206, and other information.

Figure 3A:
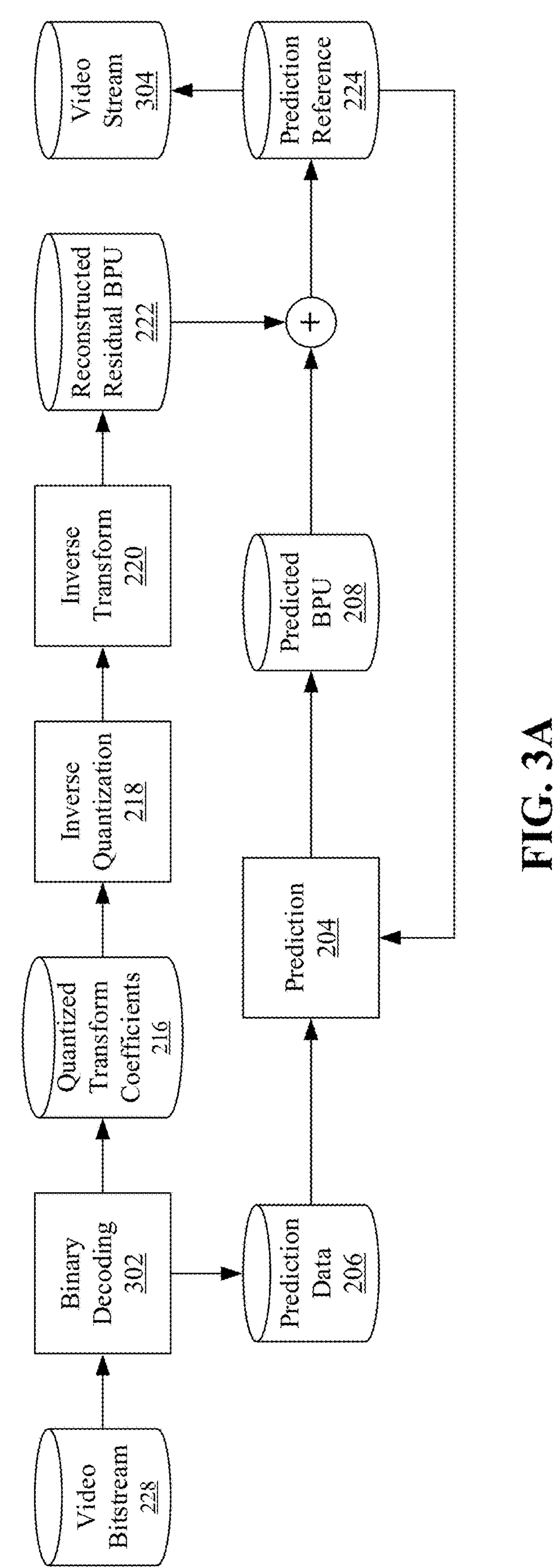
FIG. 3A is a schematic diagram illustrating an exemplary decoding process of a hybrid video coding system, consistent with embodiments of the disclosure.

FIG. 3A illustrates a schematic diagram of an exemplary decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIG. 2A and FIG. 2B), generally, video stream 304 is not identical to video sequence 202. Similar to processes 200A and 200B in FIG. 2A and FIG. 2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, syntax elements of the prediction operation, a transform type, syntax elements of the quantization process (e.g., quantization syntax elements), an encoder control syntax element (e.g., a bitrate control syntax element), or the like. In some embodiments, if video bitstream 228 is transmitted over a network in packets, the decoder can depacketize video bitstream 228 before feeding it to binary decoding stage 302.

Figure 3B:
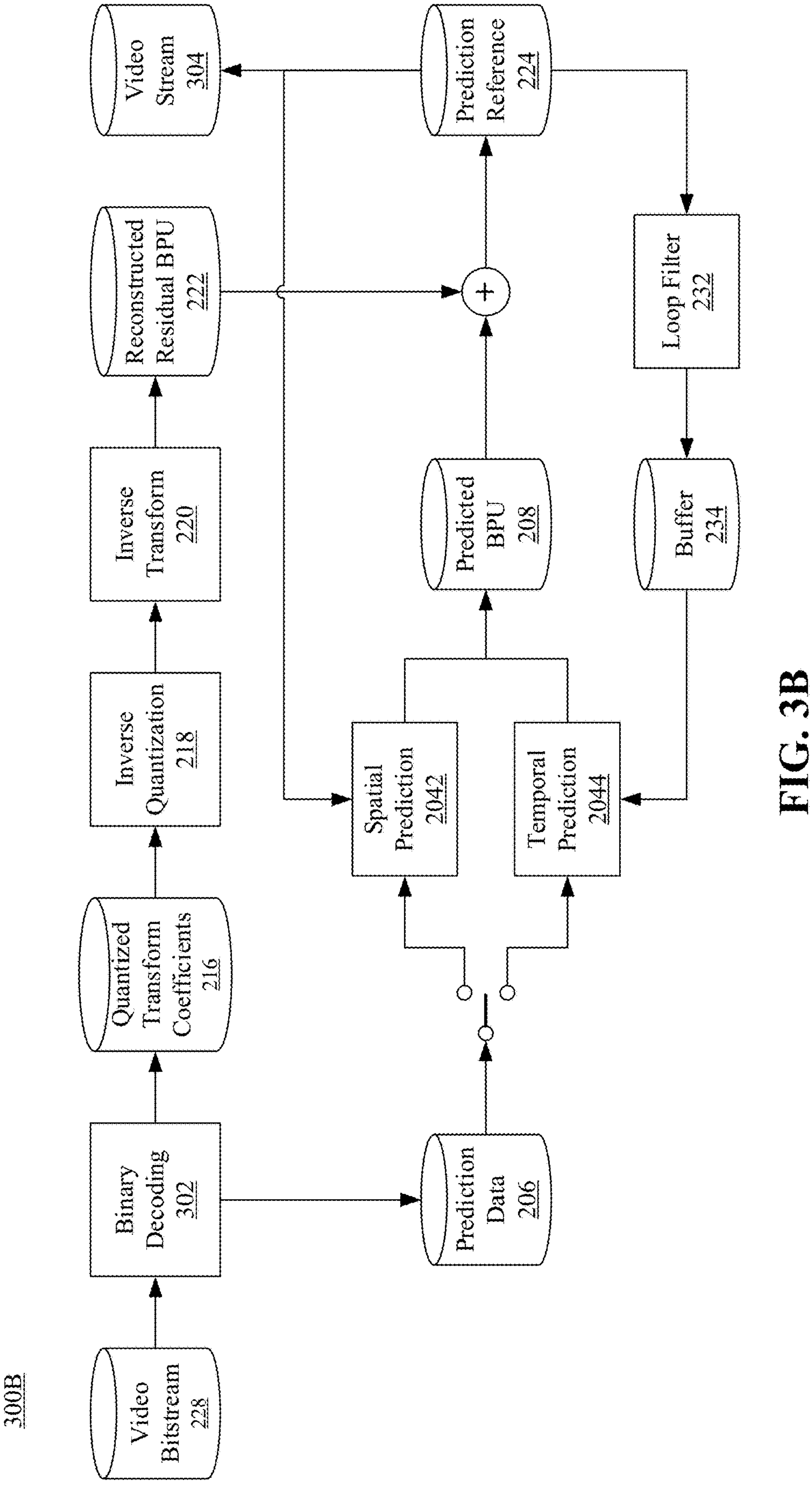
FIG. 3B is a schematic diagram illustrating another exemplary decoding process of a hybrid video coding system, consistent with embodiments of the disclosure.

FIG. 3B illustrates a schematic diagram of another exemplary decoding process 300B, consistent with embodiments of the disclosure. Process 300B can be modified from process 300A. For example, process 300B can be used by a decoder conforming to a hybrid video coding standard (e.g., H.26×series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, syntax elements of the intra prediction operation, or the like. The syntax elements of the intra prediction operation can include, for example, locations (e.g., coordinates) of one or more neighboring BPUs used as a reference, sizes of the neighboring BPUs, syntax elements of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, syntax elements of the inter prediction operation, or the like. The syntax elements of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer (DPB) in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include syntax elements of the loop filter (e.g., a loop filter strength). In some embodiments, prediction data includes syntax elements of the loop filter when the prediction mode indicator of prediction data 206 indicates that inter prediction was used to encode the current BPU.

Figure 4:
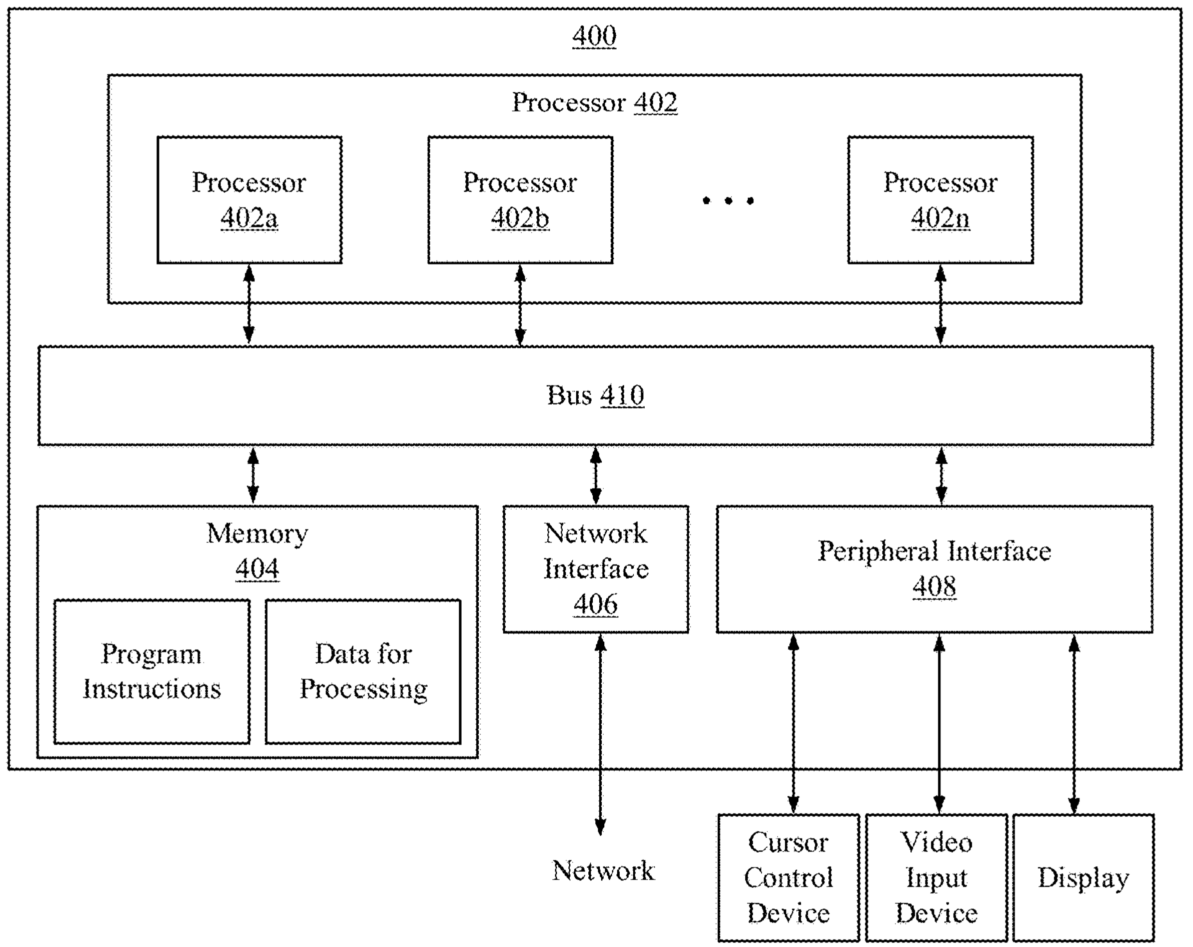
FIG. 4 is a block diagram of an exemplary apparatus for encoding or decoding a video, according to some embodiments of the present disclosure.

FIG. 4 is a block diagram of an exemplary apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

As videos continuously develop from standard definition to ultra-high definition, a spatial resolution develops from 720p to 4K or 8K, and a frame rate develops from 24 fps to 60 fps or 120 fps. Frame rate is a measure for measuring a quantity of static picture frames displayed in a video, of which a measurement unit is frame per second (FPS) or hertz. The FPS is usually used for describing a quantity of static picture frames displayed in a video per second. As a speed of fast video playback increases, high requirements are imposed on a resolution and a playback frame rate. For example, for a video with a frame rate at 120 fps, to achieve a capability of playback at a 4-fold speed (i.e., 4.0×), it means that a playback frame rate needs to reach 480 fps. However, when a central processing unit (CPU) is used to implement software decoding or system on chip (SoC) hardware chip decoding, it is difficult to satisfy the high requirements on the resolution and the playback frame rate. In addition, it is difficult to satisfy high requirements for exponential increase in a network transmission speed and on a network environment that are imposed in response to the increase in the playback frame rate.

In video decoding, a video sequence may be decoded frame by frame at a target frame rate, which relies on frames included in the to-be-decoded video sequence. Because a decoding speed is limited by a specification of a CPU or an SoC hardware chip, a high target frame rate cannot be achieved, and therefore an expected playback speed may not be achieved. In addition, when the expected playback speed is very high, but a specification of a CPU or an SoC hardware chip of an actual playback device cannot satisfy the capability expected by a user, the CPU or the SoC hardware chip performs decoding and playback at an extreme speed that may be borne by the device. In this case, power consumption of the device increases, the device overheats, an endurance decreases, and so on. After a period of time, some devices in the state will enable a self-protection mechanism such as reducing a CPU frequency, to further reduce the decoding speed and the playback speed, which affects stability of the devices and user experience. In other words, because an amount of data to be transmitted in a same time multiplies, if the video sequence is decoded without frame extraction, it is difficult to bear an excessively high video data transmission speed in a poor network environment, and therefore it is difficult to satisfy the high requirements on the resolution and the playback frame rate are difficult to be satisfied.

To satisfy a requirement for a corresponding playback frame rate during playback at variable speeds as much as possible, a decoding and frame extraction solution may be designed based on a visual persistence effect of human eyes. Partial frames may be extracted during playback at a speed higher than 1×, to reduce a quantity of to-be-decoded frames without affecting a subjective visual effect.

Generally, the above technical solution of frame-by-frame decoding and playback is mainly optimized by extracting non-reference frames. A non-reference frame is an image frame not for reference for a P-frame or a B-frame during prediction. A reference frame is an image frame for reference for a P-frame or a B-frame during prediction. The non-reference frames in the video sequence are extracted while remaining image frames are decoded and played. Through the frame extraction, decoding of some image frames can be reduced, and an amount of computation can be reduced, so that power consumption of decoding by the CPU or the SoC hardware chip is reduced, thereby satisfying a requirement for during playback at a speed higher than 1×. Moreover, due to the visual persistence effect, the human eyes cannot perceive the frame extraction in the video. Therefore, only very little impact is exerted on watching experience of a user.

However, not all encoded images carry reference frame flags or non-reference frame flags. In this case, a player cannot recognize a reference frame or a non-reference frame. Therefore, the non-reference frame cannot be extracted. In other words, for such type of video bitstream, the high requirement for playback at various speeds cannot be satisfied by extracting the non-reference frame from the video sequence. In addition, in this manner, a frame extraction proportion depends on a proportion of non-reference frames to the image frames that are included, and cannot be increased or reduced. That is to say, the frame extraction proportion is inflexible. In particular, when the expected playback speed is relatively high, frame extraction with a larger proportion cannot be achieved. In this case, a load of video data that needs to be transmitted through a network per unit time is still excessively high, and power consumption of decoding and playback by the player is still excessively high, and even the expected playback speed and network transmission speed may not be achieved.

A core idea of embodiments of the present disclosure lies in a solution including determining frame dropping positions in combination with Presentation Time stamps (PTS) features and non-reference frame flags, performing frame extraction level by level, and performing frame dropping based on the non-reference frame flags. The non-reference frame may be extracted based on a specific rule, and a reference frame may be extracted level by level, to significantly increase a frame dropping rate, significantly reduce an amount of computation of video processing processes such as decoding and rendering in a playback device, and reduce a processing time, thereby increasing a speed of fast playback, improving smoothness of fast playback, reducing power consumption of the playback device, and prolonging an endurance of the playback device. Further, during fast playback, a playback frame rate is high. Therefore, uniform frame extraction may be performed on the video at a specific proportion based on the visual persistence effect of the human eyes. The video may still be played continuously, while the human eyes cannot perceive any frame extraction in the video. In this way, the requirement for the corresponding playback frame rate during playback at various speeds may be satisfied. PTS is a time stamp for displaying, which is used for notifying a player of a time at which data of a current frame needs to be displayed.

Figure 5:
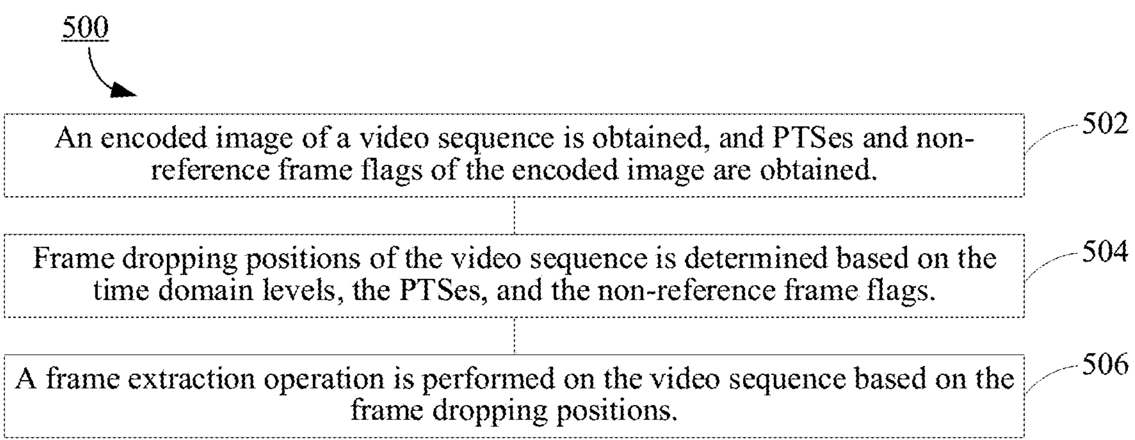
FIG. 5 is a flowchart of an exemplary method for frame extraction processing of a video, according to some embodiments of the present disclosure.

FIG. 5 is a flowchart of an exemplary a method 500 for frame extraction processing of a video, according to some embodiments of the present disclosure. Method 500 may include steps 502 to 506.

At step 502, an encoded image of a video sequence is obtained, and PTSes and non-reference frame flags of the encoded image are obtained.

In the present disclosure, to satisfy a requirement for a corresponding playback frame rate during playback at various speeds as much as possible, partial frames may be extracted in a decoding and frame extraction manner based on a visual persistence effect of human eyes during playback at a speed higher than 1×, to reduce a quantity of to-be-decoded frames without affecting a subjective visual effect, thereby satisfying high requirements for an increase in a network transmission speed and on a network environment that are imposed in response to the increase in the playback frame rate.

Specifically, compared with the related art in which frame extraction is not performed on an original video or only a non-reference frame is extracted from the original video, in some embodiments, frame dropping positions may be determined in combination with the PTS features and the non-reference frame flags, frame extraction may be performed level by level, and frame dropping may be performed based on the non-reference frame flags, which significantly increases a frame dropping rate, thereby increasing a speed of fast playback and improving smoothness of fast playback, and thereby satisfying high requirements on a resolution and a playback frame rate under a demand for playback at various speeds.

During the determination of the frame dropping positions based on the PTS features and the non-reference frame flags, a video sequence (e.g., video sequence 100 shown in FIG. 1) of the original video may be obtained first. The video sequence is generally a sequence obtained through encoding of frames of the original video based on a specific encoding structure. The obtained video sequence may include an encoded image. The encoded image has an encoding structure that is used during the video encoding. In some embodiments, the encoding structure that is used may be an encoding structure with time domain levels, which is not limited in the present disclosure.

The encoded image obtained through encoding based on the encoding structure may include a plurality of image frames. Each image frame generally has a Decoding Time Stamp (DTS) used for notifying a player of a time at which data of the frame needs to be decoded and a PTS used for notifying the player of a time at which the data of the frame needs to be displayed. In other words, a DTS order (that is, a decoding order) formed based on the DTS and a PTS order (that is, a playback order or display order) formed based on the PTS may exist.

Specifically, for the DTS order and the PTS order, when no B-frame exists in the original video stream, the DTS order and the PTS order are usually consistent. When the B-frame exists, the B-frame that arrives first cannot be decoded immediately, and needs to wait for a subsequent I-frame and P-frame depending thereon to be decoded first. In this case, the playback order (that is, the PTS order) is inconsistent with the decoding order (that is, the DTS order). Therefore, the order is disrupted. In other words, if a current image frame is played and the current frame is the B-frame (which makes reference to a next frame), the next frame may be decoded first to achieve decoding of the current image frame.

Figure 6:
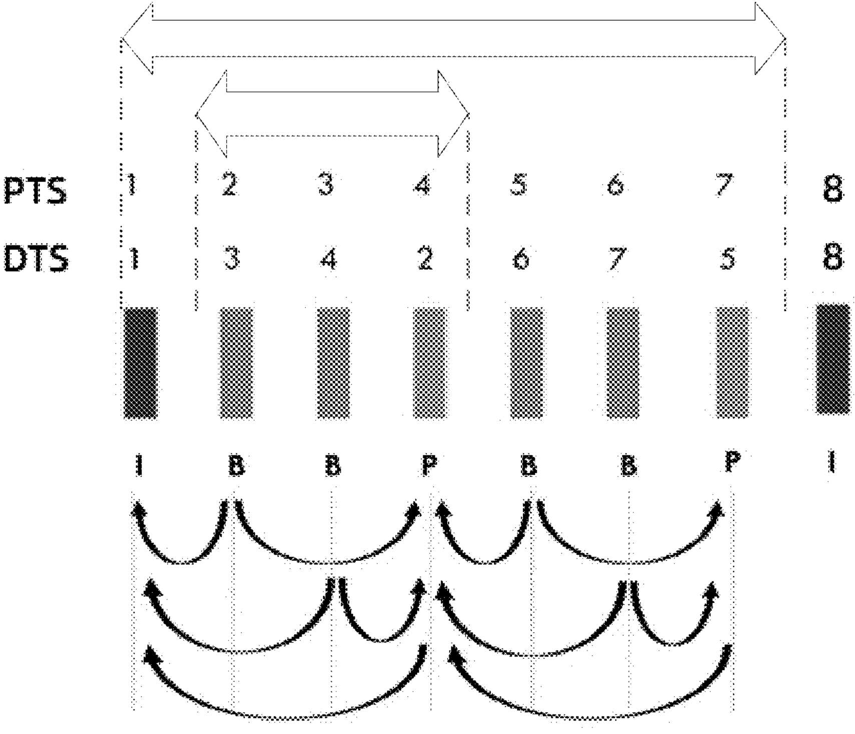
FIG. 6 is a schematic structural diagram of a reference frame of a video sequence, according to some embodiments of the present disclosure.

FIG. 6 is a schematic structural diagram of a reference frame of a video sequence, according to some embodiments of the present disclosure. Exemplarily, as shown in FIG. 6, in a video, it is assumed that a display order of frames is: I B B P. Information in the P-frame needs to be learned during decoding of the B-frame. A decoding order of the frames in the video stream may be: I P B B. In other words, an order in which the frame images need to be displayed may be learned based on the PTS order, and an order in which the frame images need to be decoded may be learned based on the DTS order.

In addition, for each image frame, a reference frame and a non-reference frame may exist. The reference frame may be marked by using a reference frame flag, and the non-reference frame may be marked by using a non-reference frame flag.

In some embodiments, to determine the frame dropping positions in combination with the PTS features and the non-reference frame flags, after the video sequence of the original video is obtained, a PTS and a non-reference frame flag of each image frame may be obtained based on the encoded image of the video sequence.

At step 504, frame dropping positions of the video sequence is determined based on the time domain levels, the PTSes, and the non-reference frame flags.

Specifically, first frame dropping positions of the video sequence may be determined based on the time domain levels and the PTSes, to implement subsequent level-by-level frame extraction of the video sequence based on the determined first frame dropping position. In addition, a second frame dropping position of the video sequence may be determined based on the time domain levels and the non-reference frame flags when the level-by-level frame extraction of the video sequence is implemented, to implement subsequent frame dropping of the video sequence based on the determined first frame dropping positions and second frame dropping positions and the non-reference frame flags.

In a practical application, during the determination of the frame dropping position of the video sequence to complete subsequent frame dropping, the determination usually may be implemented based on a frame sequence. In other words, frame sequences included in the video sequence may be used as cycles for processing section by section. Specifically, the frame sequences may be used as cycles to determine the frame dropping positions of the video sequence based on the time domain levels and the PTSes and the non-reference frame flags.

FIG. 6 is a schematic structural diagram of a reference frame of a video sequence, according to some embodiments of the present disclosure. As shown in FIG. 6, a distance between two I-frames in an encoded video sequence may be referred to as a group of pictures (GOP). In the common sense, a GOP starts from an I-frame and ends at a frame before a next I-frame. For example, I B B P B B P form a GOP. A frame sequence may be a mini-GOP composed of continuous B-frames and one Instantaneous decoder refresh (IDR) frame, I-frame or P-frame. For example, B B P form a mini-GOP. One video sequence may include a plurality of mini-GOPs. IDR frame is a specific type of I-frame, and is mainly used for immediate refresh, from which a new sequence is calculated for encoding, so that an error does not propagate. In some cases, the I-frame may be referenced across frames, but the IDR frame is free of the problem.

During specific implementation, in terms of a manner of determining the frame dropping positions in the frame sequences, time domain levels in the frame sequences at which a start frame and image frames located in the same frame sequence are located may be determined based on the encoding structure of the encoded image, to determine the frame dropping positions based on the time domain levels, the PTSes, and the non-reference frame flags. Specifically, a first frame extraction policy for the PTSes and a second frame extraction policy for the non-reference frame flags may be obtained, and then frame dropping positions of the time domain levels in the frame sequences may be determined based on the first frame extraction policy and the second frame extraction policy. In some embodiments, the first frame extraction policy and the second frame extraction policy are determined based on an encoding structure of an actual encoded image. A policy that satisfies a corresponding frame extraction requirement may be generated based on a time domain level. Specifically, the first frame extraction policy for the PTSes is a level-by-level frame extraction policy by using the PTSes based on the time domain levels, and the second frame extraction policy for the non-reference frame flags is a frame extraction policy by using a non-reference frame based on the time domain levels.

In some embodiments, the combination of level-by-level frame extraction and the frame extraction based on the non-reference frame flags may be achieved by conversion of a frame extraction policy for a current image frame during determination whether to perform frame dropping on an image frame in a time domain level.

Specifically, the first frame extraction policy for the PTSes may be obtained first, and the first frame dropping positions of the frame sequences may be determined based on the time domain levels and the first frame extraction policy. Then a mapping relationship for the encoded image may be obtained, and to-be-encoded image frames of a current time domain level may be mapped based on the mapping relationship, to obtain a display order after the mapping. When the first frame dropping position in the display order after the mapping does not satisfy a preset order, the second frame dropping position of the frame sequences may be determined by using the second frame extraction policy. In other words, the determination in combination with the PTS features and the non-reference frame flags may be implemented based on the first frame dropping position and the second frame dropping position that are determined based on the different frame extraction policies.

In some embodiments, during frame extraction during decoding of the video sequence, the frame dropping positions may be determined based on different frame sequences. In this case, a plurality of first frame dropping positions exist for different frame sequences when the first frame extraction policy is used, and a plurality of second frame dropping positions exist for different frame sequences when the second frame extraction policy is used. In addition, in a same frame sequence, the frame dropping positions are mainly determined based on different time domain levels. In this case, a plurality of first frame dropping positions exist for different time domain levels when the first frame extraction policy is used, and a plurality of second frame dropping positions exist for different time domain levels when the second frame extraction policy is used. In other words, the first frame dropping positions generally refer to the frame dropping positions determined based on the first frame extraction policy, and the second frame dropping positions generally refer to the frame dropping positions determined based on the second frame extraction policy. In other words, the determined frame dropping positions include the first frame dropping positions and the second frame dropping positions, which is not limited herein.

At step 506, a frame extraction operation is performed on the video sequence based on the frame dropping positions.

After the frame dropping positions are determined, target frames of the video sequence are determined based on the frame dropping positions, and the frame extraction operation is performed on the target frames. Level-by-level frame extraction may be performed on the video sequence based on the determined frame dropping positions, and frame dropping may be performed on the video sequence based on the non-reference frame flags. The non-reference frames may be extracted based on a specific rule, and the reference frames may be extracted level by level, which can significantly increase the frame dropping rate, significantly reduce an amount of computation of video processing processes such as decoding and rendering in a playback device, and reduce a processing time, thereby increasing the speed of fast playback, improving smoothness of fast playback, reducing power consumption of the playback device, and prolonging an endurance of the playback device.

Specifically, based on the different frame extraction policies that are used, the determined frame dropping positions may include the first frame dropping positions determined by using the first frame extraction policy for the PTSes and the second frame dropping positions determined by using the second frame extraction policy for the non-reference frame flags. In addition, the first frame dropping positions of the video sequence may be determined based on the time domain levels and the PTSes, to implement subsequent level-by-level frame extraction of the video sequence based on the determined first frame dropping positions. The second frame dropping positions of the video sequence may be determined based on the time domain levels and the non-reference frame flags when the level-by level-frame extraction of the video sequence is implemented, to implement subsequent frame dropping of the video sequence based on the determined first frame dropping positions and second frame dropping positions and the non-reference frame flags. During the frame extraction operation on the target frames, a first target frame at the first frame dropping position and a second target frame at the second frame dropping position in the video sequence may be obtained, and the frame extraction operation is performed on the first target frame and the second target frame in the video sequence.

In some embodiments, the video sequence after the frame extraction operation can satisfy an expected playback speed. In this case, corresponding variable-speed playback may be further performed on the video sequence after the frame extraction operation at the expected playback speed. During fast playback, a playback frame rate is high. Therefore, uniform frame extraction may be performed on the video at a specific proportion based on the visual persistence effect of the human eyes. In this way, the video may still be played continuously, while the human eyes cannot perceive any frame extraction in the video. In other words, the requirement for the corresponding playback frame rate during playback at various speeds may be satisfied.

In some embodiments, the PTSes and the non-reference frame flags of the encoded image of the video sequence may be obtained, and the frame dropping positions may be determined in combination with the PTSes and the non-reference frame flags, to perform the frame extraction operation on the video sequence based on the determined frame dropping positions, implementing the level-by-level frame extraction operation on the video sequence based on the time domain levels and performing frame dropping based on the non-reference frame flags, so that the frame dropping rate is significantly increased, the amount of computation of video processing processes such as decoding and rendering during playback of the video sequence is significantly reduced, and the processing time is reduced. In this way, the speed of fast playback and smoothness of fast playback are increased, which satisfies high requirements on a resolution and a playback frame rate under a demand for playback at various speeds.

Figure 7:
FIG. 7 is a flowchart of another exemplary method for frame extraction processing of a video, according to some embodiments of the present disclosure.

FIG. 7 is a flowchart of an exemplary method 700 for frame extraction processing of a video, according to some embodiments of the present disclosure. Method 700 may include steps 702 to 706.

At step 702, a first frame extraction policy for PTSes is obtained, and first frame dropping positions of frame sequences are determined based on time domain levels and the first frame extraction policy.

In some embodiments, the frame dropping positions may be determined in combination with the PTS features and non-reference frame flags, frame extraction may be performed level by level, and frame dropping may be performed based on the non-reference frame flags, which significantly increases a frame dropping rate, thereby increasing a speed of fast playback and improving smoothness of fast playback, and thereby satisfying high requirements on a resolution and a playback frame rate under a demand for playback at various speeds.

In some embodiments, to determine the frame dropping positions in combination with the PTS features and the non-reference frame flags, after a video sequence of an original video is obtained, a PTS and a non-reference frame flag of each image frame may be obtained based on an encoded image of the video sequence, to implement subsequent level-by-level frame extraction of the video sequence based on the determined frame dropping positions and implement subsequent frame dropping of the video sequence based on the determined frame dropping positions and the non-reference frame flags.

Specifically, the first frame dropping position of the video sequence may be determined based on the time domain levels and the PTSes, to implement subsequent level-by-level frame extraction of the video sequence based on the determined first frame dropping position. In addition, the second frame dropping position of the video sequence may be determined based on the time domain levels and the non-reference frame flags when the level-by-level frame extraction of the video sequence is implemented, to implement subsequent frame dropping of the video sequence based on the determined first frame dropping positions and second frame dropping positions and the non-reference frame flags.

In a practical application, during the determination of the frame dropping of the video sequence to complete subsequent frame dropping, the determination usually may be implemented based on a frame sequence. In other words, frame sequences included in the video sequence may be used as cycles for processing section by section. Specifically, the frame sequences may be used as cycles to determine the frame dropping positions of the video sequence based on the time domain levels and the PTSes and the non-reference frame flags.

In some embodiments, the first frame extraction policy for the PTSes may be obtained, and the first frame dropping position of the frame sequences may be determined based on the time domain levels and the first frame extraction policy. The process of determining the first frame dropping positions based on the first frame extraction policy may be implemented through determination of frame dropping positions of the time domain levels in the frame sequences based on the first frame extraction policy. Specifically, the first frame dropping position of the frame sequences may be determined based on the time domain levels and the first frame extraction policy.

The time domain levels may include a plurality of time domain levels ranked from a high level to a low level. In this case, image frames located at each time domain level may be obtained; then the image frames of a high-level time domain level are used as first target frames based on the first frame extraction policy, and positions in the frame sequences at which the first target frames are located are determined as the first frame dropping positions. If the determined first target frames do not satisfy a preset frame dropping rate, the image frames of the time domain levels are continuously used as the first target frames from the high level to the low level, and the positions in the frame sequences at which the first target frames are located are determined as the first frame dropping positions, until the determined first target frames satisfy the preset frame dropping rate.

The first frame extraction policy may be performing frame extraction in a specific priority order based on the time domain levels at which the image frames are located. A principle of the frame extraction is to ensure that decoding of an image frame at another time domain level is not affected after extraction. Since frame decoding of the high time domain level depends on frame decoding of a low time domain level, a priority of frame extraction is first performing extraction on the high time domain level and then dropping frames of the low time domain level if a decoding speed is insufficient, that is, specifically the image frames of the time domain levels are extracted level by level from the high level to the low level.

Exemplarily, it is assumed that a plurality of time domain levels may include a third time domain level, a second time domain level, and a first time domain level ranked from the high level to the low level. During frame dropping of the third time domain level by using the first frame extraction policy, frame dropping may be performed on image frames in the third time domain level. If the frame dropping rate still does not reach the preset frame dropping rate after the image frames of the third time domain level are extracted, the frame dropping may be further performed on image frames of the second time domain levels in addition to the image frames in the third time domain level. If the frame dropping rate still does not reach the preset frame dropping rate after the image frames of the third time domain level and the second time domain level are extracted, the frame dropping may be further performed on image frames of the first time domain level until the preset frame dropping rate is reached.

In some embodiments, a quantity of the time domain levels may be mainly determined based on an encoding structure, and specific image frames in different time domain levels may be determined based on a start frame in a specific frame sequence. In other words, level-by-level frame extraction may be performed on different time domain levels in the frame sequences based on different encoding structures and the first frame extraction policy.

Based on the principle of dropping frames in the lower time domain levels when the decoding speed (which is determined based on the decoding frame rate) is insufficient, during level-by-level extraction of image frames, the preset frame dropping rate is determined based on a frame dropping proportion that may satisfy an expected decoding frame rate. A value of the expected decoding frame rate may satisfy an expected playback speed. It is assumed that a 1-hour video stream exists, which has an original frame rate of 60 fps. If the video stream is expected to be played in 1 hour, the playback may be referred to as playback at 1×, and a decoding frame rate of 60 fps may implement the playback at 1×. If the video stream is expected to be played in half an hour, the playback may be referred to as playback at 2×. In this case, if the frame dropping is not considered, the decoding frame rate needs to reach 120 fps; and if the frame dropping is considered, for example, if the frame dropping rate reaches 50%, playback at 120 fps may be implemented when the decoding frame rate is 60 fps. That is, a decoding frame rate of 120 fps corresponding to an expected playback speed of 2× may be implemented based on the preset frame dropping rate of 50%.

At step 704, a mapping relationship for the encoded image is obtained, and to-be-decoded image frames of a current time domain level is mapped based on the mapping relationship, to obtain a display order after the mapping, e.g., a mapped display order.

The level-by-level frame extraction and the frame extraction based on the non-reference frame flags may be combined, which may be achieved by conversion of a frame extraction policy for a current image frame during determination whether to perform frame dropping on an image frame in a time domain level. Specifically, a first frame extraction policy for the PTSes may be obtained, or a second frame extraction policy for the non-reference frame flags may be obtained, and the frame dropping positions of the time domain levels in the frame sequences are determined based on the first frame extraction policy and the second frame extraction policy.

Specifically, the first frame extraction policy for the PTSes may be obtained first, and the first frame dropping positions of the frame sequences may be determined based on the time domain levels and the first frame extraction policy. Then a mapping relationship for the encoded image may be obtained, and to-be-encoded image frames of a current time domain level may be mapped based on the mapping relationship, to obtain a display order after the mapping. When the first frame dropping positions in the display order after the mapping does not satisfy a preset order, second frame dropping positions of the frame sequences may be determined by using the second frame extraction policy. In other words, the determination in combination with the PTS features and the non-reference frame flags may be implemented based on the first frame dropping positions and the second frame dropping positions that are determined based on the different frame extraction policies.

The mapping relationship for the encoded image may mainly be used for representing a conversion relationship between a presentation order (a PTS order) and a decoding order (a DTS order) of the video sequence, which may mainly be obtained based on array lookup. In some embodiments, the DTS order, the PTS order, and the mapping relationship between the DTS order and the PTS order may be determined based on the encoding structure.

At step 706, second frame dropping positions of the frame sequences is determined by using a second frame extraction policy in response to that the first frame dropping positions in the display order after the mapping do not satisfy a preset order.

The combination of the first frame extraction policy and the second frame extraction policy may be converting the frame extraction policy after the first frame dropping positions are determined based on the first frame extraction policy, then determining the second frame dropping positions based on the second frame extraction policy, and implementing the frame extraction operation on the video sequence in combination with the first frame dropping positions and the second frame dropping positions.

In some embodiments, the to-be-encoded image frames of the current time domain level may be mapped based on the mapping relationship, to obtain the display order after the mapping. When the first frame dropping positions in the display order after the mapping do not satisfy the preset order after the first frame dropping positions are determined, the second frame dropping positions of the frame sequences may be determined by using the second frame extraction policy.

The presentation order (that is, the PTS order) is usually an ascending order. If a larger frame is located before a smaller one, it indicates that the frame extraction policy may be converted.

The process of determining the second frame dropping positions by using the second frame extraction policy may be determining the second frame dropping positions of the frame sequences based on the non-reference frame flags carried in the encoded image and the second frame extraction policy. First, the first frame dropping positions in the display order after the mapping that do not satisfy the preset order are determined as erroneous frame positions, and then the second frame dropping positions are determined based on the non-reference frame flags of the encoded image and the erroneous frame positions.

Specifically, image frames in the decoding order for the encoded image located after the erroneous frame positions may be obtained. The encoded image may have reference frame flags and/or the non-reference frame flags. When the encoded image has the non-reference frame flags, to-be-extracted image frames may be determined based on the non-reference frame flags. Specifically, positions of image frames having the non-reference frame flags are determined from image frames corresponding to the erroneous frame positions and the image frames located after the erroneous frame positions as the second frame dropping positions.

Exemplarily, non-reference frame flag bits specified in different encoding standards may be shown in Table 1:

TABLE 1

| Encoding standard | Position of a flag bit | Value |
|---|---|---|
| H.264/AVC | nal_ref_idc | 0 |
| H.265/HEVC | nal_unit_type | 0, 2, 4, 6, 8, 10, 12, 14 |
| H.266/VVC | ph_non_ref_pic_flag | 1 |

In some embodiments, the flag bits in Table 1 are the reference frame flags and the non-reference frame flags, and mainly indicate whether the frame is referenced for other frames, and the values in the table are mainly the non-reference frame flags, and are used for representing the non-reference frames, which are usually specified based on the encoding standards in the related art and have precise meanings. Details are not described herein in the present disclosure. In other words, in some embodiments, during determination of the frame dropping positions by using the second frame extraction policy, the non-reference frame may be dropped based on the values in Table 1 corresponding to the corresponding encoding standard.

In a practical application, during the determination of the frame dropping positions by using the second frame extraction policy, the same priority policy for the determination of the frame dropping positions by using the first frame extraction policy is also used. That is to say, level-by-level frame dropping is also performed on the non-reference frames in the corresponding time domain levels ranked from the high level to the low level. When the preset frame dropping rate is satisfied, the determination of the second frame dropping positions is stopped to stop sequential frame dropping. In some embodiments, during the determination of the non-reference frames of the corresponding time domain levels as the second frame dropping positions for frame dropping by using the second frame extraction policy, the corresponding time domain levels are determined based on the time domain levels at which the first frame extraction policy is executed before the policy conversion. In other words, the second frame extraction policy for the non-reference frame flags is mainly a frame extraction policy that may be implemented for the non-reference frame flags based on the time domain levels.

In some embodiments, during the determination of the frame dropping positions by using the second frame extraction policy, if the encoded image does not carry the non-reference frame flags, the second frame dropping positions are not determined. Since the determined second frame dropping positions are used for frame dropping, the frame dropping is not performed.

In some embodiments, during the frame extraction based on the first frame extraction policy, the first frame dropping positions of the video sequence are determined based on the time domain levels and the PTSes, to implement subsequent level-by-level frame extraction of the video sequence based on the determined first frame dropping positions. In addition, during the frame extraction based on the second frame extraction policy, the second frame dropping positions of the video sequence are determined based on the time domain levels and the non-reference frame flags when the level-by-level frame extraction of the video sequence is implemented, to implement subsequent frame dropping of the video sequence based on the determined first frame dropping positions and second frame dropping positions and the non-reference frame flags. Specifically, after the first frame dropping positions are determined, in response to that the first frame dropping positions in the display order after the mapping do not satisfy the preset order, the second frame dropping positions of the frame sequences may be determined by using the second frame extraction policy. The second frame dropping positions and the first frame dropping positions that previously satisfied the preset order may be used as target frame dropping positions. After the first frame dropping positions are determined, in response to that the first frame dropping positions in the display order after the mapping satisfy the preset order, the first frame dropping positions are used as the target frame dropping positions. In other words, policy convention is not performed, and the second frame dropping positions do not need to be determined based on the converted second frame extraction policy.

Exemplarily, due to a high compression rate, a Random Access (RA) encoding structure is widely used in application scenarios that may tolerate a specific delay such as On demand and Live streaming. The RA coding means encoding in a random access manner, which is a commonly used encoding structure in a universal test condition of standards such as H.265/HEVC and H.266/VVC. In the RA coding, a hierarchical B structure is mainly used, and some clean random access (CRA) frames are periodically inserted and become random access points (RAPs) in an encoded video stream. The RAPs may be independently decoded without reference to a previously decoded image frame in the bitstream. Due to a high compression rate, the RA mode is widely used in application scenarios that may tolerate a specific delay such as On demand and Live streaming. All intra (AI) coding means encoding in an all intra manner, and is a commonly used encoding structure in a universal test condition of standards such as H.265/HEVC and H.266/VVC. In the AI coding, spatial domain predictive coding may be performed on each picture in an intra manner without using a time reference frame. Low delay (LD) coding means encoding at a low delay, which is a commonly used encoding structure in a universal test condition of standards such as H.265/HEVC and H.266/VVC. In the LD coding, a first picture is encoded in an intra manner and becomes an IDR frame, and subsequent frames may be encoded as a generalized P and B picture (GPB). This is mainly designed for interactive real-time communication.

The frame extraction processing of the video sequence is described in some embodiments of the present disclosure by using the RA encoding structure as an example.

Figure 8A:
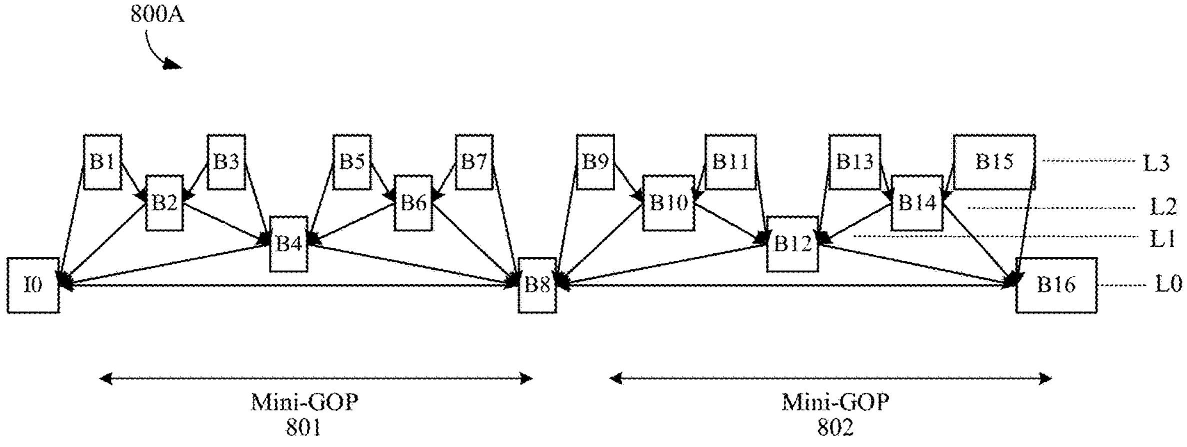
FIG. 8A to FIG. 8G are schematic diagrams of Random Access (RA) encoding structures with different frame lengths, according to some embodiments of the present disclosure.

Specifically, FIG. 8A to FIG. 8G are schematic diagrams of RA encoding structures with different frame lengths, according to some embodiments of the present disclosure. FIG. 8A shows a typical RA encoding structure 800A including a mini-GOP with a length of 8. The figure includes two mini-GOPs 801 and 802, of which frames may be respectively expressed as B1 to B8 and B9 to B16.

In the GOP structure, a PTS order (that is, a display order) of the frames in a first mini-GOP 801 may be displaying the first frame first, then displaying the second frame, and then displaying the third frame. In other words, the PTS order is 1, 2, 3, 4, 5, 6, 7, 8. A DTS order (that is, a decoding order) may be decoding the eighth frame first, then decoding the fourth frame, and then decoding the second frame. In other words, the DTS order is 8, 4, 2, 1, 3, 6, 5, 7.

It may be learned from the above that the DTS order is a time stamp (PTS) order of 8, 4, 2, 1, 3, 6, 5, 7, which means that a first decoded frame is the eighth frame in chronological order, a second decoded frame is the fourth frame in chronological order, a third decoded frame is the second frame in chronological order, and so on. Since a subscript of a number starts from 0 in program code, the mapping relationship between the DTS order and the PTS order may be expressed as follows:

the zeroth decoded frame is the seventh frame in chronological order, that is, DTS_index2PTS_index[0]=7;

the first decoded frame is the third frame in chronological order, that is, DTS_index2PTS_index[1]=3;

the second decoded frame is the first frame in chronological order, that is, DTS_index2PTS_index[2]=1;

Therefore, the mapping relationship between the DTS order and the PTS order may be expressed as DTS_index2PTS_index[8]={7, 3, 1, 0, 2, 5, 4, 6}.

In some embodiments, the decoding order and the display order are closely related to the RA encoding structure. In other words, once the RA encoding structure is determined, the DTS order, the PTS order, and the mapping relationship between the DTS order and the PTS order may be determined.

The RA encoding structure 800A shown in FIG. 8A is a very typical and widely used encoding structure in a practical application. The encoding structure 800A may be referred to as a pyramid structure. A zeroth level L0 of the pyramid includes frames of a bottom level, and decoding of the frames depends on the frames of the zeroth level L0 or another reference frame of the zeroth level L0. A first level L1 of the pyramid includes frames of a second level from the bottom level, and decoding of the frames depends on reference frames of the zeroth level L0 and the first level L1. The second level L2 of the pyramid includes frames of a third level from the bottom level, and decoding of the frames depends on the reference frames of the zeroth level L0, the first level L1, and the second level L2. The third level L3 of the pyramid includes frames of a fourth level from the bottom level, and the frames are located at a high level of the pyramid, and decoding depends on the reference frames of the levels included in the pyramid, but there are no higher-level frames whose decoding depends on the frames. That is, the frames at the third level L3 are non-reference frames. In a practical application, since a video includes images distributed in different time domains, the levels of the pyramid are also referred to as time domain levels. In other words, the RA encoding structure is a structure having the time domain levels.

Based on the above reference relationship and a frame extraction principle that extraction of target frames should not affect decoding of image frames of other levels, the frames of the high time domain level may be extracted first, and the frames of the low domain level frames may be dropped when a decoding speed is insufficient. A priority of frame dropping may be first extracting the image frames at the third time domain level L3. In this case, for the PTS order, frame dropping may be performed every one frame. For one mini-GOP cycle, for example mini-GOP 801, shown in FIG. 8A, four frames (e.g., B1, B3, B5, and B7) may be dropped, and a frame dropping rate thereof is 4/8=50%; if it is assumed that an expected playback frame rate of 4× is 240 fps, the decoding frame rate in this case needs to reach 120 fps. If the decoding speed is still insufficient, in addition to the image frames of the third time domain level L3, the image frames of the second time domain level L2 may be further extracted. In this case, for the PTS order, three frames may be dropped every four frames, and therefore six frames (i.e., B1, B2, B3, B5, B6, and B7) may be dropped in one mini-GOP cycle 801. The frame dropping rate is 6/8=75%; if it is assumed that the frame rate of the 4× is 240 fps, the decoding frame rate in this case needs to reach 60 fps. If the decoding speed is still insufficient, the image frames of the third time domain level L3, the second time domain level L2, and the first time domain level L1 may be extracted. In other words, seven frames may be dropped in one mini-GOP cycle. In this case, the frame dropping rate is 7/8=87.5%; if it is assumed that the frame rate of the 4× is 240 fps, the decoding frame rate needs to reach 30 fps.

A time domain level to which a current to-be-decoded frame belongs usually may be determined based on the PTS. In other words, by using the PTS feature of each frame, specifically, by using a relative magnitude of the PTS, a frame with a largest PTS may be located and be used as a start frame of a frame sequence. Then it may be determined based on the start frame and the encoding structure that a preset number of image frames located after the start frame and the start frames are located at a same frame sequence, and the time domain level of each image frame in the same frame sequence may be determined based on a corresponding encoding structure. Exemplarily, as shown in FIG. 8A, the first mini-GOP 801 is used as an example. The DTS order is 8, 4, 2, 1, 3, 6, 5, 7. That is, the frame with the largest PTS (i.e., B8) is a start frame of mini-GOP 801, and the following seven frames belong to the same mini-GOP as the start frame.

After location based on the PTS features, the image frames of each time domain level may be extracted by using the first frame extraction policy level by level, that is, from the high level to the low level.

Specifically, the image frames located at each time domain level may be obtained. Then the image frames of the high-level time domain level are used as the first target frames based on the first frame extraction policy, and the positions in the frame sequences at which the first target frames are located are determined as the first frame dropping positions. The image frames of the time domain levels are continuously used as the first target frames from the high level to the low level if the determined first target frames do not satisfy the preset frame dropping rate, and the positions in the frame sequences at which the first target frames are located are determined as the first frame dropping positions, until the determined first target frames satisfy the preset frame dropping rate.

Determination of the frame dropping positions is performed by using the encoding structure 800A shown in FIG. 8A. Exemplarily, during extraction of the image frames of the third time domain level, it is assumed that the frame B8 in first mini-GOP 801 with the largest PTS is located, then the frame B4 is located, and then the frame B2 is located. Based on the policy of performing frame dropping every one frame in the PTS order, the subsequent frames B1 and B3 may be dropped. Then the frame B6 is located, and the subsequent frames B5 and B7 may be dropped. Frame dropping in the DTS order is flag=0 0 0 1 1 0 1 1, where the position 1 indicates that dropping is allowed. Specific frame dropping positions may be shown in a third row of Table 2. If the decoding speed is still insufficient, in addition to the image frames of the third time domain level L3, the image frames of the second time domain level L2 may be extracted. That is, B1, B2, B3, B5, B6, B7 may be extracted. Frame dropping in the DTS order may be flag=0 0 1 1 1 1 1 1, where the position 1 indicates that dropping is allowed. Specific frame dropping positions may be shown in a fourth row of Table 2. If the decoding speed is still insufficient, the image frames of the third time domain level L3, the second time domain level L2, and the first time domain level L1 may be extracted. That is, B1, B2, B3, B4, B5, B6, B7 are extracted. Frame dropping in the DTS order may be flag=0

1 1 1 1 1 1 1, where the position 1 indicates that dropping is allowed. Specific frame dropping positions may be shown in a fifth row of Table 2.

TABLE 2

| | | | | | | | | |
|---|---|---|---|---|---|---|---|---|
| DTS order | 8 | 4 | 2 | 1 | 3 | 6 | 5 | 7 |
| PTS order | 1 | 2 | 3 | 4 | 5 | 6 | 7 | 8 |
| Frame dropping in the third time domain level | 0 | 0 | 0 | 1 | 1 | 0 | 1 | 1 |
| Frame dropping in the third time domain level and the second time domain level | 0 | 0 | 1 | 1 | 1 | 1 | 1 | 1 |
| Frame dropping in the third time domain level, the second time domain level, and the first time domain level | 0 | 1 | 1 | 1 | 1 | 1 | 1 | 1 |

In some embodiments, the frame dropping positions may be determined through a look-up table during specific code implementation.

In a specific case, due to a keyframe interval arranged externally or some keyframes inserted forcibly, an incomplete mini-GOP may be caused.

Figure 8B:
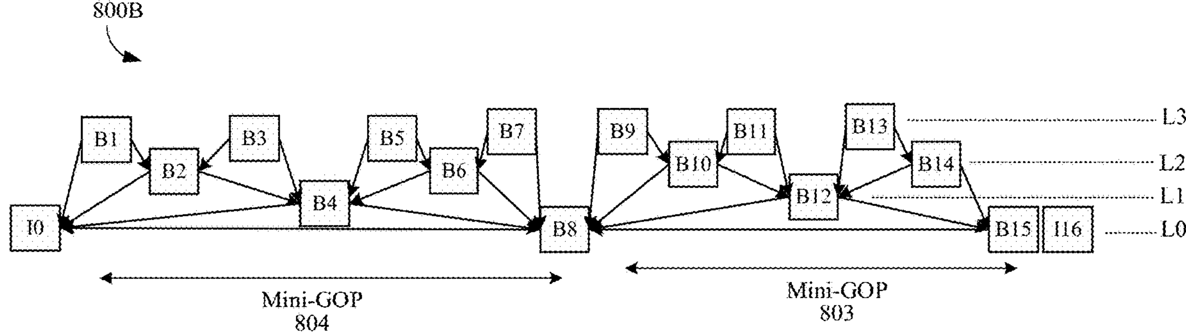

Exemplarily, FIG. 8B shows a typical RA encoding structure 800B including a mini-GOP 803 with a length of 7. When the length of the mini-GOP is 7, if a keyframe is arranged at a position 116, an adjacent mini-GOP 803 in front thereof has a length of 7. Since a playback device determines whether to perform frame dropping while receiving each frame of bitstream, if bitstreams of the entire mini-GOP cannot be obtained, that is, that the current mini-GOP 803 includes 7 frames cannot be learned, a reference frame structure of the current mini-GOP cannot be learned.

A frame extraction table of a first mini-GOP 804 shown in FIG. 8B may be shown in Table 2. A frame extraction table of a second mini-GOP 803 may be shown in Table 3 with reference to Table 2. Through the mapping relationship between the DTS order and the PTS order, a PTS order obtained through a first row of DTS indexes is 9, 10, 11, 12, 13, 14, empty, 15. The frames after the mapping are in order, and therefore the above frame dropping solution may still be used.

Specifically, when the last three rows of the table are not changed, that is, when the frame extraction positions are not changed, the frame dropping positions include B9, B11, and B13 during frame dropping of the third time domain level L3, the frame dropping positions include B10, B9, B11, B14, and B13 during frame dropping of the third time domain level L3 and the second time domain level L2, and the frame dropping positions include B12, B10, B9, B11, B14, and B13 during frame dropping of the third time domain level L3, the second time domain level L2, and the first time domain level L1. The frame extraction solution for the mini-GOP with the length of 8 is applicable to the case of the mini-GOP with the length being equal to 7.

TABLE 3

| | | | | | | | | |
|---|---|---|---|---|---|---|---|---|
| DTS order | 15 | 12 | 10 | 9 | 11 | 14 | 13 | — |
| PTS order | 9 | 10 | 11 | 12 | 13 | 14 | — | 15 |
| Frame dropping in the third time domain level | 0 | 0 | 0 | 1 | 1 | 0 | 1 | 1 |
| Frame dropping in the third time domain level and the second time domain level | 0 | 0 | 1 | 1 | 1 | 1 | 1 | 1 |
| Frame dropping in the third time domain level, the second time domain level, and the first time domain level | 0 | 1 | 1 | 1 | 1 | 1 | 1 | 1 |

Figure 8C:
Figure 8C:
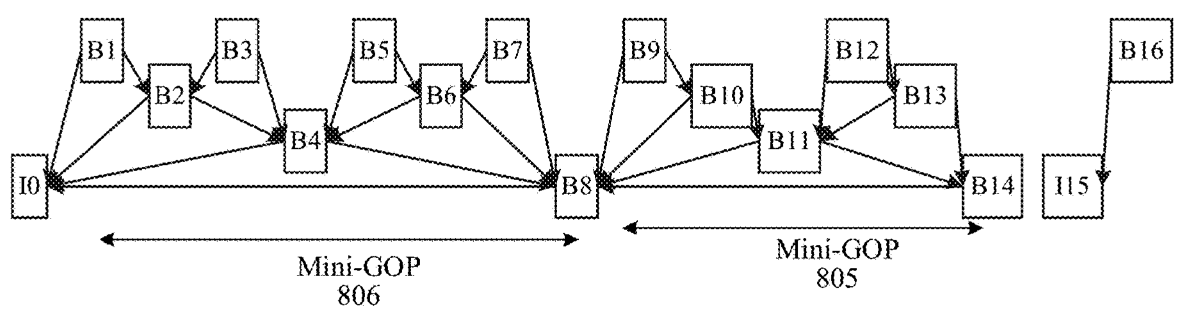

Exemplarily, FIG. 8C shows a typical RA encoding structure 800C with a mini-GOP length of 6. When the length of the mini-GOP is 6, if a keyframe is arranged at a position 115, an adjacent mini-GOP 805 in front of 115 has a length of 6. Since a playback device determines whether to perform frame dropping while receiving each frame of bitstream, if bitstreams of the entire mini-GOP 805 cannot be obtained, that is, that the current mini-GOP 805 includes 6 frames cannot be learned, a reference frame structure of the current mini-GOP 805 cannot be learned.

A frame extraction table of a first mini-GOP 806 shown in FIG. 8C may be shown in Table 2. A frame extraction table of a second mini-GOP 805 may be shown in Table 4 with reference to Table 2. Through the mapping relationship between the DTS order and the PTS order, a PTS order obtained through a first row of DTS indexes is 9, 10, 13, 11, empty, 12, empty, 14. The frame B13 after mapping is out of order, which indicates that the mini-GOP 805 is incomplete. B9 and B13 will be dropped if the above frame dropping solution, that is, the first frame extraction policy is used, and a screen crash may be caused. Actually, when a decoding DTS is before the frame B13, the frame dropping may be performed based on Table 4, that is, B9 may be dropped. However, when the frame B13 is found to be out of order, the frame extraction policy may be converted for the frame B13 and image frames after the frame B13 in the DTS order. When the first frame dropping positions in the display order after the mapping do not satisfy the preset order, the second frame dropping positions of the frame sequences may be determined by using the second frame extraction policy. The determination in combination with the PTS features and the non-reference frame flags may be implemented based on the first frame dropping positions and the second frame dropping positions that are determined based on the different frame extraction policies.

Specifically, if the encoded image carries the reference frame flags or non-reference frame flags, different flags may be used to mark the non-reference frames in different encoding standards, as shown in Table 1. During frame dropping based on the non-reference frame flags, B12 may be dropped, which, together with the previous dropping of B9, may protect against a screen crash. If the encoded image does not carry the non-reference frame flags, B9 in the last mini-GOP 805 of a current GOP is extracted, and the frame dropping operation is not performed on B12.

TABLE 4

| | | | | | | | | |
|---|---|---|---|---|---|---|---|---|
| DTS order | 14 | 11 | 10 | 9 | 13 | 12 | — | — |
| PTS order | 9 | 10 | 13 | 11 | — | 12 | — | 14 |
| Frame dropping in the third time domain level | 0 | 0 | 0 | 1 | 1 | 0 | 1 | 1 |
| Frame dropping in the third time domain level and the second time domain level | 0 | 0 | 1 | 1 | 1 | 1 | 1 | 1 |
| Frame dropping in the third time domain level, the second time domain level, and the first time domain level | 0 | 1 | 1 | 1 | 1 | 1 | 1 | 1 |

Figure 8D:
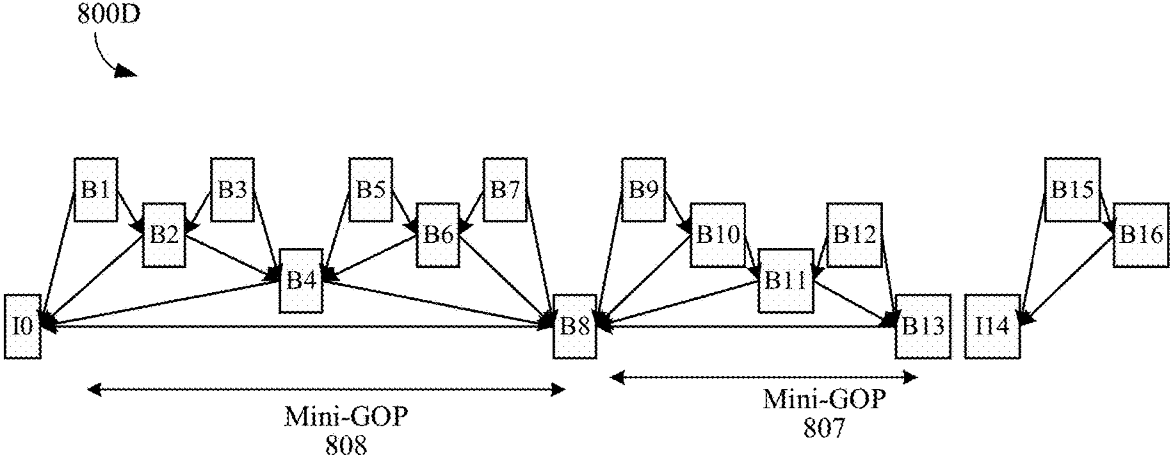

Exemplarily, FIG. 8D shows a typical RA encoding structure 800D including a mini-GOP with a length of 5. When the length of the mini-GOP is 5, if a keyframe is arranged at a position 114, an adjacent mini-GOP 807 in front of 114 has a length of 5. Since a playback device determines whether to perform frame dropping while receiving each frame of bitstream, if bitstreams of the entire mini-GOP 807 cannot be obtained, that is, that the current mini-GOP 807 includes 5 frames cannot be learned, a reference frame structure of the current mini-GOP 807 cannot be learned.

A frame extraction table of a first mini-GOP 808 shown in FIG. 8D may be shown in Table 2. A frame extraction table of a second mini-GOP 807 may be shown in Table 5 through reference of Table 2. Through the mapping relationship between the DTS order and the PTS order, a PTS order obtained through a first row of DTS indexes is 9, 10, 12, 11, empty, empty, empty, 13. The frame B12 after the mapping is out of order, which indicates that the mini-GOP 807 is incomplete. The frame extraction solution for the mini-GOP 807 with the length of 5 should be used. When the decoding DTS is before the frame B12, the frame dropping may be performed based on Table 5, that is, B9 may be dropped. However, when the frame 12 is found to be out of order, frame extraction may be performed on the frame B12 and image frames after the frame B12 in the DTS order based on the reference frame flags or non-reference frame flags.

In other words, if the encoded image carries the reference frame flags or non-reference frame flags, different flags may be used to mark the non-reference frames in different encoding standards, as shown in Table 1. During frame dropping based on the non-reference frame flags, B12 may be dropped, which, together with the previous dropping of B9, may protect against a screen crash. If the encoded image does not carry the non-reference frame flags, B9 in a last mini-GOP 807 of a current GOP is extracted, and the frame dropping operation is not performed on B12.

TABLE 5

| | | | | | | | | |
|---|---|---|---|---|---|---|---|---|
| DTS order | 13 | 11 | 10 | 9 | 12 | — | — | — |
| PTS order | 9 | 10 | 12 | 11 | — | — | — | 13 |
| Frame dropping in the third time domain level | 0 | 0 | 0 | 1 | 1 | 0 | 1 | 1 |
| Frame dropping in the third time domain level and the second time domain level | 0 | 0 | 1 | 1 | 1 | 1 | 1 | 1 |
| Frame dropping in the third time domain level, the second time domain level, and the first time domain level | 0 | 1 | 1 | 1 | 1 | 1 | 1 | 1 |

Figure 8E:
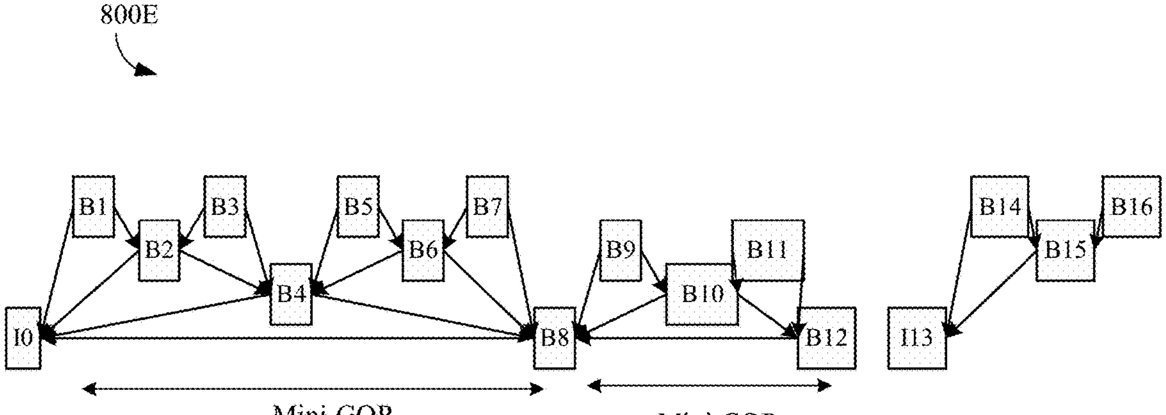

Exemplarily, FIG. 8E shows a typical RA encoding structure 800E including a mini-GOP with a length of 4. When the length of the mini-GOP is 4, if a keyframe is arranged at a position 113, an adjacent mini-GOP 809 in front of 113 has a length of 4. Since a playback device determines whether to perform frame dropping while receiving each frame of bitstream, if bitstreams of the entire mini-GOP 809 cannot be obtained, that is, that the current mini-GOP 809 includes 4 frames cannot be learned, a reference frame structure of the current mini-GOP 809 cannot be learned.

A frame extraction table of a first mini-GOP 810 shown in FIG. 8E may be shown in Table 2. A frame extraction table of a second mini-GOP 809 may be shown in Table 6 through reference of Table 2. Through the mapping relationship between the DTS order and the PTS order, a PTS order obtained through a first row of DTS indexes is 11, 9, empty, 10, empty, empty, empty, 12. The frame B11 after the mapping is out of order, which indicates that the mini-GOP 809 is incomplete. In this case, the frame extraction solution for the mini-GOP 809 with the length of 4 may be used. When the decoding DTS is before the frame B11, the frame dropping may be performed based on Table 6. However, it may be learned from the third row of Table 6 that three frames with DTSes before B11 cannot be dropped. However, when the frame B11 is found to be out of order, frame extraction may be performed on the frame B11 and image frames after the frame B11 in the DTS order based on the reference frame flags or non-reference frame flags.

Specifically, if the encoded image carries the reference frame flags or non-reference frame flags, different flags may be used to mark the non-reference frames in different encoding standards, as shown in Table 1. During frame dropping based on the non-reference frame flags, B11 may be dropped, so that the screen crash is prevented. If the encoded image does not carry the non-reference frame flags, the frame dropping cannot be performed on a last mini-GOP 809 of a current GOP.

TABLE 6

| | | | | | | | | |
|---|---|---|---|---|---|---|---|---|
| DTS order | 12 | 10 | 9 | 11 | — | — | — | — |
| PTS order | 11 | 9 | — | 10 | — | — | — | 12 |
| Frame dropping in the third time domain level | 0 | 0 | 0 | 1 | 1 | 0 | 1 | 1 |
| Frame dropping in the third time domain level and the second time domain level | 0 | 0 | 1 | 1 | 1 | 1 | 1 | 1 |
| Frame dropping in the third time domain level, the second time domain level, and the first time domain level | 0 | 1 | 1 | 1 | 1 | 1 | 1 | 1 |

Figure 8F:
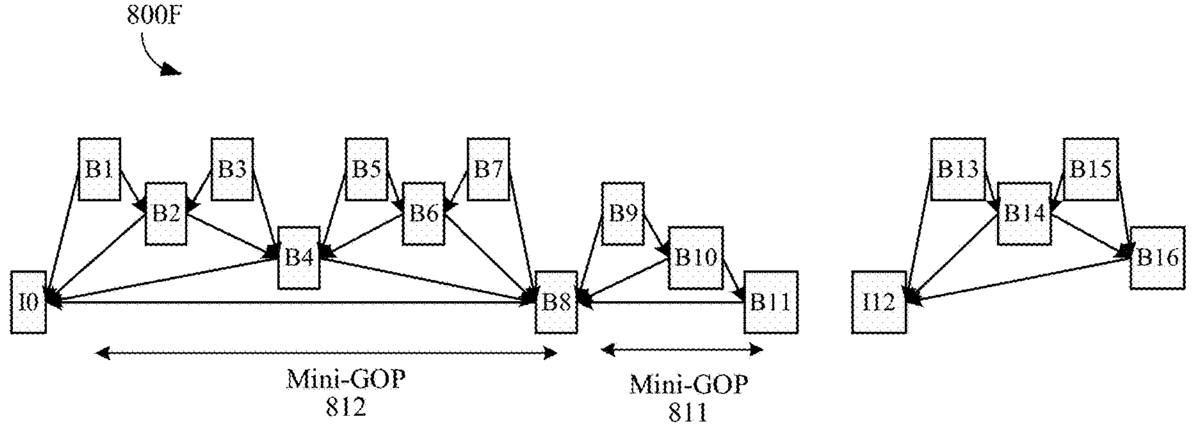

Exemplarily, FIG. 8F shows a typical RA encoding structure 800F including a mini-GOP with a length of 3. When the length of the mini-GOP is 3, if a keyframe is arranged at a position 112, an adjacent mini-GOP in front of 112 has a length of 3. Since a playback device determines whether to perform frame dropping while receiving each frame of bitstream, if bitstreams of the entire mini-GOP 811 cannot be obtained, that is, that the current mini-GOP 811 includes 3 frames cannot be learned, a reference frame structure of the current mini-GOP 811 cannot be learned.

A frame extraction table of a first mini-GOP 812 shown in FIG. 8F may be shown in Table 2. A frame extraction table of a second mini-GOP 811 may be shown in Table 7 through reference of Table 2. Through the mapping relationship between the DTS order and the PTS order, a PTS order obtained through a first row of DTS indexes is empty, 9, empty, 10, empty, empty, empty, 11. The frames after the mapping are all in order, and therefore the above frame dropping solution (that is, the first frame extraction policy) may still be used. The screen crash will not occur. Specifically, when the last three rows of the table are not changed, that is, when the frame extraction positions are not changed, no frames are dropped during frame extraction of the frames of the third time domain level, the frame dropping positions may include B9 during frame extraction of the third time domain level and the second time domain level, and the frame dropping positions may include B9 and B10 during frame extraction of the third time domain level, the second time domain level, and the first time domain level. In other words, the first frame extraction policy is applicable to the case of the mini GOP 811 with the length being equal to 3.

TABLE 7

| | | | | | | | | |
|---|---|---|---|---|---|---|---|---|
| DTS order | 11 | 10 | 9 | — | — | — | — | — |
| PTS order | — | 9 | — | 10 | — | — | — | 11 |
| Frame dropping in the third time domain level | 0 | 0 | 0 | 1 | 1 | 0 | 1 | 1 |
| Frame dropping in the third time domain level and the second time domain level | 0 | 0 | 1 | 1 | 1 | 1 | 1 | 1 |

TABLE 7-continued

| | | | | | | | | |
|---|---|---|---|---|---|---|---|---|
| Frame dropping in the third time domain level, the second time domain level, and the first time domain level | 0 | 1 | 1 | 1 | 1 | 1 | 1 | 1 |

Figure 8G:
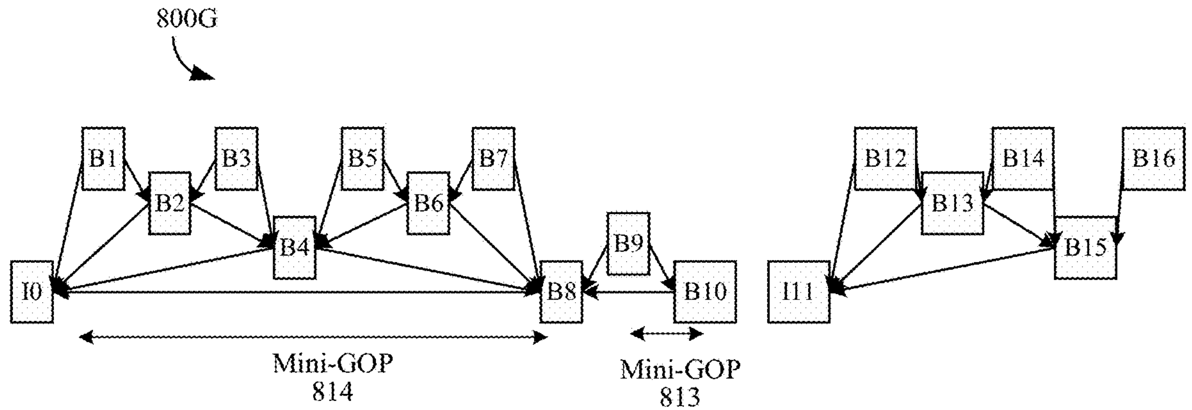

Exemplarily, FIG. 8G shows a typical RA encoding structure 800G including a mini-GOP with a length of 2. When the length of the mini-GOP is 2, if a keyframe is arranged at a position I11, an adjacent mini-GOP 813 in front of I11 has a length of 2. Since a playback device determines whether to perform frame dropping while receiving each frame of bitstream, if bitstreams of the entire mini-GOP 813 cannot be obtained, that is, that the current mini-GOP 813 includes 2 frames cannot be learned, a reference frame structure of the current mini-GOP 813 cannot be learned.

A frame extraction table of a first mini-GOP 814 shown in FIG. 8G may be shown in Table 2. A frame extraction table of a second mini-GOP 813 may be shown in Table 8 through reference of Table 2.

Through the mapping relationship between the DTS order and the PTS order, a PTS order obtained through a first row of DTS indexes is empty, empty, empty, 9, empty, empty, empty, 10. The frames after the mapping are all in order, and therefore the above frame dropping solution (that is, the first frame extraction policy) may still be used. The screen crash will not occur. Specifically, when the last three rows of the table are not changed, that is, when the frame extraction positions are not changed, no frames are dropped during frame dropping of the frames of the third time domain level, no frames are dropped during frame dropping of the third time domain level and the second time domain level, and the frame dropping positions may include B9 during frame dropping of the third time domain level, the second time domain level, and the first time domain level. In other words, the first frame extraction policy is applicable to the case of the mini GOP 813 with the length being equal to 2.

TABLE 8

| | | | | | | | | |
|---|---|---|---|---|---|---|---|---|
| DTS order | 10 | 9 | — | — | — | — | — | — |
| PTS order | — | — | — | 9 | — | — | — | 10 |
| Frame dropping in the third time domain level | 0 | 0 | 0 | 1 | 1 | 0 | 1 | 1 |
| Frame dropping in the third time domain level and the second time domain level | 0 | 0 | 1 | 1 | 1 | 1 | 1 | 1 |
| Frame dropping in the third time domain level, the second time domain level, and the first time domain level | 0 | 1 | 1 | 1 | 1 | 1 | 1 | 1 |

In some embodiments, a case of a mini-GOP with a length of 1 is relatively simple. Details are not described herein in the present disclosure.

In some embodiments, after the frame dropping positions are determined, the target frames of the video sequence may be determined based on the frame dropping positions, the frame extraction operation may be performed on the target frames, level-by-level frame extraction may be performed on the video sequence based on the determined frame dropping positions, and frame dropping may be performed on the video sequence based on the non-reference frame flags. The non-reference frames may be extracted based on a specific rule, and the reference frames may be extracted level by level, to significantly increase the frame dropping rate, significantly reduce the amount of computation of video processing processes such as decoding and rendering in the playback device, and reduce the processing time, thereby increasing the speed of fast playback, improving smoothness of fast playback, reducing power consumption of the playback device, and prolonging the endurance of the playback device.

Specifically, based on the different frame extraction policies that are used, the determined frame dropping positions may include the first frame dropping positions determined by using the first frame extraction policy for the PTSes and the second frame dropping positions determined by using the second frame extraction policy for the non-reference frame flags. During the frame extraction operation on the target frames, first target frames at the first frame dropping positions and second target frames at the second frame dropping positions in the video sequence may be obtained, and the frame extraction operation is performed on the first target frames and the second target frames in the video sequence.

In some embodiments, during frame extraction during decoding of the video sequence, the frame dropping positions may be determined based on different frame sequences. In this case, a plurality of first frame dropping positions exist for different frame sequences when the first frame extraction policy is used, and a plurality of second frame dropping positions exist for different frame sequences when the second frame extraction policy is used. In addition, in a same frame sequence, the frame dropping positions are mainly determined based on different time domain levels. In this case, a plurality of first frame dropping positions exist for different time domain levels when the first frame extraction policy is used, and a plurality of second frame dropping positions exist for different time domain levels when the second frame extraction policy is used. In other words, the first frame dropping positions may generally be the frame dropping positions determined based on the first frame extraction policy, and the second frame dropping positions may generally be the frame dropping positions determined based on the second frame extraction policy, which is not limited in the present disclosure.

In some embodiments, the video sequence after the frame extraction operation can satisfy an expected playback speed. In this case, corresponding variable-speed playback may be further performed on the video sequence after the frame extraction operation at the expected playback speed. During fast playback, a playback frame rate is high. Therefore, uniform frame extraction may be performed on the video at a specific proportion based on the visual persistence effect of the human eyes. In this way, the video may still be played continuously, while the human eyes cannot perceive any frame extraction in the video. In other words, the requirement for the corresponding playback frame rate during playback at various speeds may be satisfied.

In some embodiments, the PTSes and the non-reference frame flags of the encoded image of the video sequence may be obtained, and the frame dropping positions may be determined in combination with the PTSes and the non-reference frame flags, to perform the frame extraction operation on the video sequence based on the determined frame dropping positions, implementing the level-by-level frame extraction operation on the video sequence based on the time domain levels, and performing frame dropping based on the non-reference frame flags, so that a frame dropping rate is significantly increased, an amount of computation of video processing processes such as decoding and rendering during playback of the video sequence is significantly reduced, and a processing time is reduced. In this way, a speed of fast playback and smoothness of fast playback are increased, which satisfies high requirements on a resolution and a playback frame rate under a demand for playback at various speeds.

Figure 9:
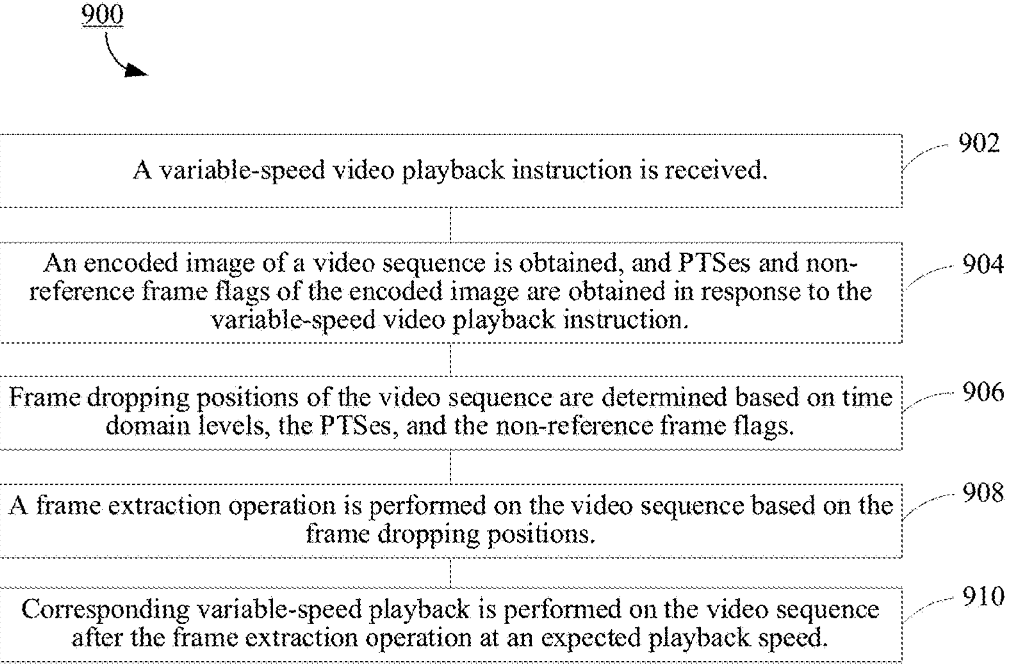
FIG. 9 is a flowchart of an exemplary method for playing a video at variable speeds, according to some embodiments of the present disclosure.

FIG. 9 is a flowchart of steps of an exemplary method 900 for playing a video at variable speeds, according to some embodiments of the present disclosure. Method 900 may include steps 902 to 910.

At step 902, a variable-speed video playback instruction is received.

According to the method for playing a video at variable speeds provided in the present disclosure, the variable-speed video playback instruction of the user may be received, so that corresponding frame extraction processing may be performed on a video based on an expected playback speed carried in the variable-speed video playback instruction during playback of the video at various speeds, and playback at various speeds may be implemented.

The variable-speed video playback instruction may be generated based on an interactive operation performed by the user on playback at various speeds. The interactive operation may be a selection operation performed on playback at various speeds. The selection operation may be a touch operation and a non-touch operation performed on playback at various speeds. A variable-speed video playback instruction generated based on the touch operation may be specifically generated as follows: the user touches and selects a speed from target variable speeds such as 1.25×, 1.5×, 2.0×, 3.0×, and 4.0× on a video playback interface provided by a video platform, and then generates the variable-speed video playback instruction based on the touch operation on the target variable speed. The generated variable-speed video playback instruction may carry the target speed touched and selected by the user, that is, an expected playback speed of the user. A variable-speed video playback instruction generated based on the non-touch operation may be specifically generated as follows: the user selects a speed from, for example, 1.25×, 1.5×, 2.0×, 3.0×, and 4.0× on the video playback interface provided by the video platform through an input device, for example, through mouse clicking or through remote selection, and then generates the variable-speed video playback instruction based on the selected target speed. The generated variable-speed video playback instruction includes the expected playback speed of the user.

At step 904, an encoded image of a video sequence is obtained, and PTSes and non-reference frame flags of the encoded image are obtained in response to the variable-speed video playback instruction.

The encoded image has an encoding structure with time domain levels.

At step 906, frame dropping positions of the video sequence are determined based on time domain levels, the PTSes, and the non-reference frame flags.

At step 908, a frame extraction operation is performed on the video sequence based on the frame dropping positions.

In some embodiments, for the specific video frame extraction processing implemented in step 904 to step 908, refer to the relevant content of the above method embodiments. Details are not described herein.

At step 910, corresponding variable-speed playback is performed on the video sequence after the frame extraction operation at an expected playback speed.

In some embodiments, based on the different frame extraction policies that are used, the determined frame dropping positions may include the first frame dropping positions determined by using the first frame extraction policy for the PTSes and the second frame dropping positions determined by using the second frame extraction policy for the non-reference frame flags. During the frame extraction operation on the target frames, first target frames at the first frame dropping positions and second target frames at the second frame dropping positions in the video sequence may be obtained, and the frame extraction operation is performed on the first target frames and the second target frames in the video sequence.

In a practical application, corresponding variable-speed playback may be performed on the video sequence after the frame extraction operation at the expected playback speed. During fast playback of the video at the expected playback speed, a playback frame rate is high. Therefore, uniform frame extraction may be performed on the video at a specific proportion based on the visual persistence effect of the human eyes. In this way, the video may still be played continuously, while the human eyes cannot perceive any frame extraction in the video. In other words, the requirement for the corresponding playback frame rate during playback at various speeds may be satisfied.

In some embodiments, the PTSes and the non-reference frame flags of the encoded image of the video sequence may be obtained, and the frame dropping positions may be determined in combination with the PTSes and the non-reference frame flags, to perform the frame extraction operation on the video sequence based on the determined frame dropping positions, implementing the level-by-level frame extraction operation on the video sequence based on the time domain levels, and performing frame dropping based on the non-reference frame flags, so that a frame dropping rate is significantly increased, an amount of computation of video processing processes such as decoding and rendering during playback of the video sequence is significantly reduced, and a processing time is reduced. In this way, a speed of fast playback and smoothness of fast playback are increased, which satisfies high requirements on a resolution and a playback frame rate under a demand for playback at various speeds.

Figure 10:
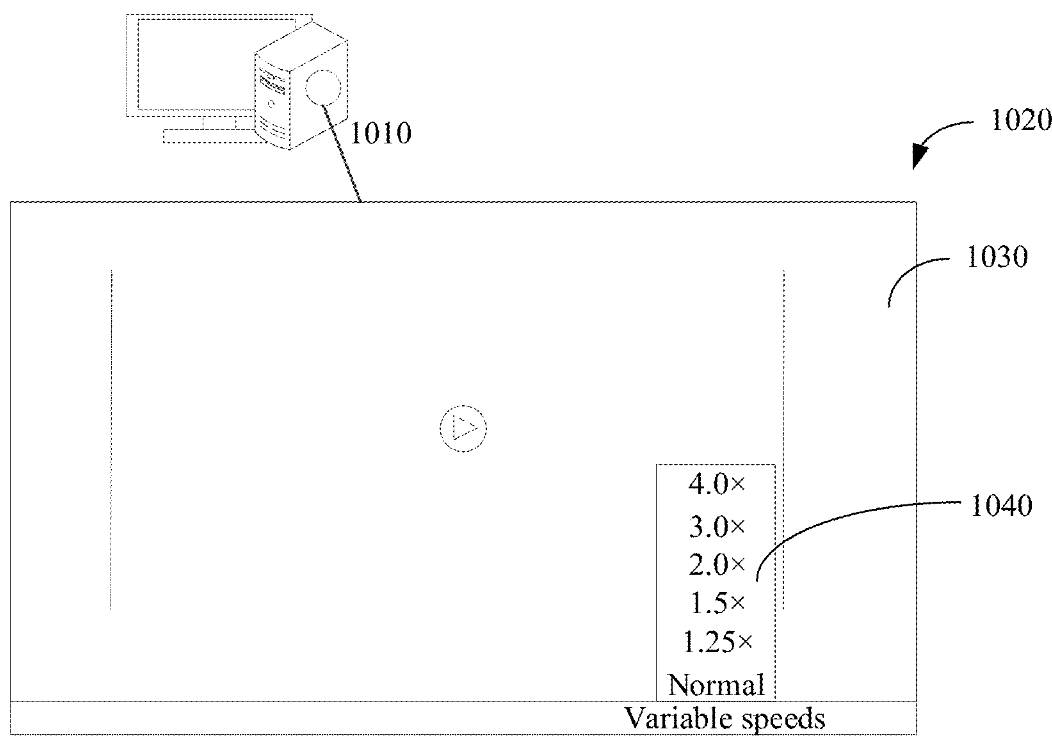
FIG. 10 is a schematic diagram of an exemplary application scenario of playing a video at variable speeds, according to some embodiments of the present disclosure.

FIG. 10 is a schematic diagram of an application scenario of playing a video at variable speeds, according to some embodiments of the present disclosure. A video platform 1010 is involved. During decoding and playback of a video sequence, the above processes of video frame extraction processing and playback at variable speeds may be implemented. In some embodiments, the video platform 1010 may satisfy a fast playback requirement for a video encoded by H.266/VVC, and is applicable to fast video playback with different encoding standards. For example, the video platform is further applicable to a video encoded by the H.264/AVC standard and the H.265/HEVC standard, and is applicable to scenarios such as Live streaming, On demand, and Real-time communication (RTC).

As shown in FIG. 10, in the field of video playback, a video 1030 may be played based on a video player 1020, and various online video websites/APPs. Usually, a function 1040 of playing a video at variable speeds may be provided to a user. For example, a fast playback capability with variable speeds such as 1.25×, 1.5×, 2.0×, 3.0×, and 4.0× may be provided.

As videos continuously develop from standard definition to ultra-high definition, a spatial resolution develops from 720p to 4K or 8K, and a frame rate develops from 24 fps to 60 fps or 120 fps. As a speed of fast video playback increases, high requirements are imposed on a resolution and a playback frame rate. For example, if a capability of playback at a 4-fold speed, that is, at 4.0× needs to be achieved, it means that a playback frame rate needs to reach 480 fps. In some embodiments, in the scenarios such as Live streaming, On demand, and RTC, a video client/player may respond to an interactive operation performed by a user on a fast playback control. Then frame dropping positions may be determined in combination with PTS features and non-reference frame flags, and solutions of performing frame extraction level by level and performing frame dropping based on the non-reference frame flags may be performed. Not only non-reference frames may be extracted based on a specific rule, but also reference frames may be extracted level by level, thereby significantly increasing a frame dropping rate, and increasing a speed of fast playback. Uniform frame extraction may be performed on the video at a specific proportion based on the visual persistence effect of the human eyes. The video may be presented to the user on a video client/player after the corresponding frame extraction, which can satisfy the requirement for the corresponding playback frame rate during playback at various speeds.

In a practical application, in the video platform, frame extraction of the video may be implemented during decoding of the video. In other words, an execution subject that implements the frame extraction operation in response to the interactive operation performed by the user on the fast playback control is a codec. The codec may perform frame extraction on the video sequence in such a way that a preset frame dropping rate is satisfied, and then may output decoded data and return the decoded data to the user based on a client of the video platform for display at a corresponding expected playback speed.

In some embodiments, in addition to the case of performing the interactive operation on the fast playback control, a case without performing control interaction is also feasible. For example, when a client suddenly receives videos that are previously accumulated due to congestion after recovery of network transmission, the method for frame extraction processing of a video provided in the present disclosure may be used, to reach a speed based on the manner of frame extraction and playback at various speeds.

In some embodiments, the encoding standards that are involved are not limited to H.264/AVC, H.265/HEVC, and H.266/VVC mentioned in the present disclosure, and are further applicable to other international and domestic video encoding standards. The length of the mini-GOP is not limited to 8 as mentioned in the present disclosure, and may be further extended to other lengths such as 16, 32, or 64. The non-reference frame flags are not limited to the flags listed in Table 1, and should include non-reference frame flag methods supported in any standard or flag methods in different privately defined service scenarios. For the solution of determining the frame dropping positions in combination with the PTS features and the non-reference frame flags, the frame dropping positions may be determined based on only the PTS features, or the frame dropping operation may be performed when requirements on both the PTS features and the non-reference frame flags are satisfied. The above content is not limited in the present disclosure.

In some embodiments, in the above video playback scenarios, different requirements of different clients for the frame rate may be satisfied through playback after frame extraction. For example, an original frame rate of a video may be retained on a large screen. A requirement on a playback frame rate may be appropriately lowered for some low-end mobile phones or clients with a poor network condition. In other words, by reducing the playback frame rate through frame extraction, performance defects of the low-end mobile phones may be alleviated, or problems regarding experience such as a lag and an excessive latency due to the poor network condition of some clients may be ameliorated.

In some embodiments, for ease of description, the method embodiments are described as a series of actions. However, a person skilled in the art should learn that embodiments of the present disclosure are not limited to the described order of the actions, because some steps may be performed in other orders or simultaneously according to the embodiments of the present disclosure. In addition, a person skilled in the art should learn that the embodiments described in the present disclosure are all preferred embodiments, and that the involved actions are not necessarily required by the embodiments of the present disclosure.

Figure 11:
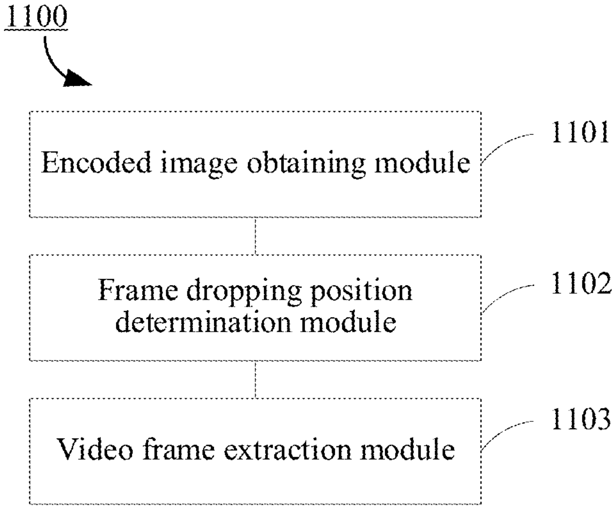
FIG. 11 is a structural block diagram of an exemplary apparatus for frame extraction processing of a video, according to some embodiments of the present disclosure.

FIG. 11 is a structural block diagram of an exemplary apparatus 1100 for frame extraction processing of a video, according to some embodiments of the present disclosure. The apparatus 1100 may include an encoded image obtaining module 701, a frame dropping position determination module 702, and a video frame extraction module 703.

Encoded image obtaining module 701 includes circuitry configured to obtain an encoded image of a video sequence, and obtain PTSes and non-reference frame flags of the encoded image, where the encoded image has an encoding structure with time domain levels.

Frame dropping position determination module 702 includes circuitry configured to determine frame dropping positions of the video sequence based on the time domain levels, the PTSes, and the non-reference frame flags.

Video frame extraction module 703 includes circuitry configured to perform a frame extraction operation on the video sequence based on the frame dropping positions.

In some embodiments, frame dropping position determination module 702 may include the following sub-modules: a frame sequence obtaining sub-module including circuitry configured to obtain a frame sequence of the video sequence, where the frame sequence includes a plurality of frame sequences; and a frame dropping position determination sub-module including circuitry configured to determine, by using the frame sequences as cycles, the frame dropping positions of the video sequence based on the time domain levels, the PTSes, and the non-reference frame flags.

In some embodiments, the frame sequence obtaining sub-module may include the following units: a start frame obtaining unit including circuitry configured to obtain a start frame of each frame sequence in the video sequence based on the PTSes; and a frame sequence obtaining unit including circuitry configured to determine, based on the start frame and the encoding structure, that a preset number of image frames located after the start frame and the start frame belong to a same frame sequence.

In some embodiments, the frame dropping position determination sub-module may include the following units: a time domain level determination unit including circuitry configured to determine, based on the encoding structure of the encoded image, time domain levels in the frame sequences at which a start frame and image frames located in the same frame sequence are located; and a frame dropping position determination unit including circuitry configured to determine the frame dropping positions based on the time domain levels, the PTSes, and the non-reference frame flags.

In some embodiments, the frame dropping position determination unit may include the following sub-units: a frame extraction policy obtaining sub-unit including circuitry configured to obtain a first frame extraction policy for the PTSes, and obtain a second frame extraction policy for the non-reference frame flags; and a frame dropping position determination sub-unit including circuitry configured to determine frame dropping positions of the time domain levels in the frame sequences based on the first frame extraction policy and the second frame extraction policy.

Specifically, that the frame dropping position determination sub-unit determines the target frame dropping positions of the time domain levels in the frame sequences based on the first frame extraction policy and the second frame extraction policy includes: determining first frame dropping positions of the frame sequences based on the time domain levels and the first frame extraction policy; obtaining a mapping relationship for the encoded image, and mapping to-be-encoded image frames of a current time domain level based on the mapping relationship, to obtain a display order after the mapping, where the mapping relationship indicates a conversion relationship between a display order and a decoding order of the video sequence; determining second frame dropping positions of the frame sequences by using the second frame extraction policy in response to that the first frame dropping positions in the display order after the mapping do not satisfy a preset order, and using the second frame dropping positions as the frame dropping positions of the video sequence; and using the first frame dropping positions as the frame dropping positions of the video sequence in response to that the first frame dropping positions in the display order after the mapping satisfy the preset order after the first frame dropping positions are determined.

The time domain levels include a plurality of time domain levels ranked from a high level to a low level, and the determining first frame dropping positions of the frame sequences based on the time domain levels and the first frame extraction policy includes: obtaining image frames located at the time domain levels; using the image frames of a high-level time domain level as first target frames based on the first frame extraction policy, and determining positions in the frame sequence at which the first target frames are located as the first frame dropping positions; and continuously using the image frames of the time domain levels as the first target frames from the high level to the low level if the determined first target frames do not satisfy a preset frame dropping rate, and determining the positions in the frame sequences at which the first target frames are located as the first frame dropping positions, until the determined first target frames satisfy the preset frame dropping rate, where the preset frame dropping rate is determined based on an expected decoding frame rate, and the expected decoding frame rate satisfies an expected playback speed. The determining second frame dropping positions of the frame sequences by using the second frame extraction policy includes: determining the second frame dropping positions of the frame sequences based on the non-reference frame flags carried in the encoded image and the second frame extraction policy. The determining the second frame dropping positions of the frame sequences based on the non-reference frame flags carried in the encoded image includes: determining the first frame dropping positions in the display order after the mapping that do not satisfy the preset order as erroneous frame positions; and determining the second frame dropping positions based on the non-reference frame flags of the encoded image and the erroneous frame positions. The determining the second frame dropping positions based on the non-reference frame flags of the encoded image and the erroneous frame positions includes: obtaining image frames in the decoding order for the encoded image located after the erroneous frame positions; and determining, from image frames corresponding to the erroneous frame positions and the image frames located after the erroneous frame positions, positions of image frames having the non-reference frame flags as the second frame dropping positions if the encoded image has reference frame flags and/or the non-reference frame flags. The determining the second frame dropping positions based on the non-reference frame flags of the encoded image and the erroneous frame positions further includes: skipping determining the second frame dropping positions if the encoded image does not carry the non-reference frame flags.

In some embodiments, video frame extraction module 703 may include the following sub-modules: a video frame extraction sub-module including circuitry configured to determine target frames of the video sequence based on the frame dropping positions, and perform the frame extraction operation on the target frames, where the frame dropping positions include first frame dropping positions determined by using a first frame extraction policy for the PTSes and second frame dropping positions determined by using a second frame extraction policy for the non-reference frame flags. The video frame extraction sub-module may include the following units: a target frame obtaining unit including circuitry configured to obtain first target frames in the video sequence located at the first frame dropping positions and second target frames in the video sequence located at the second frame dropping positions; and a video frame extraction unit including circuitry configured to perform the frame extraction operation on the first target frames and the second target frames in the video sequence.

In some embodiments, the video sequence after the frame extraction operation satisfies an expected playback speed, and the apparatus for frame extraction processing of a video provided in the present disclosure may further include the following module: a variable-speed playback module including circuitry configured to perform corresponding variable-speed playback on the video sequence after the frame extraction operation at the expected playback speed.

In some embodiments, according to the apparatus for frame extraction processing of a video provided in the present disclosure, the PTSes and the non-reference frame flags of the encoded image of the video sequence may be obtained, and the frame dropping positions may be determined in combination with the PTSes and the non-reference frame flags, to perform the frame extraction operation on the video sequence based on the determined frame dropping positions, implementing the level-by-level frame extraction operation on the video sequence based on the time domain levels, and performing frame dropping based on the non-reference frame flags, so that a frame dropping rate is significantly increased, an amount of computation of video processing processes such as decoding and rendering during playback of the video sequence is significantly reduced, and a processing time is reduced. In this way, a speed of fast playback and smoothness of fast playback are increased, which satisfies high requirements on a resolution and a playback frame rate under a demand for playback at various speeds.

Figure 12:
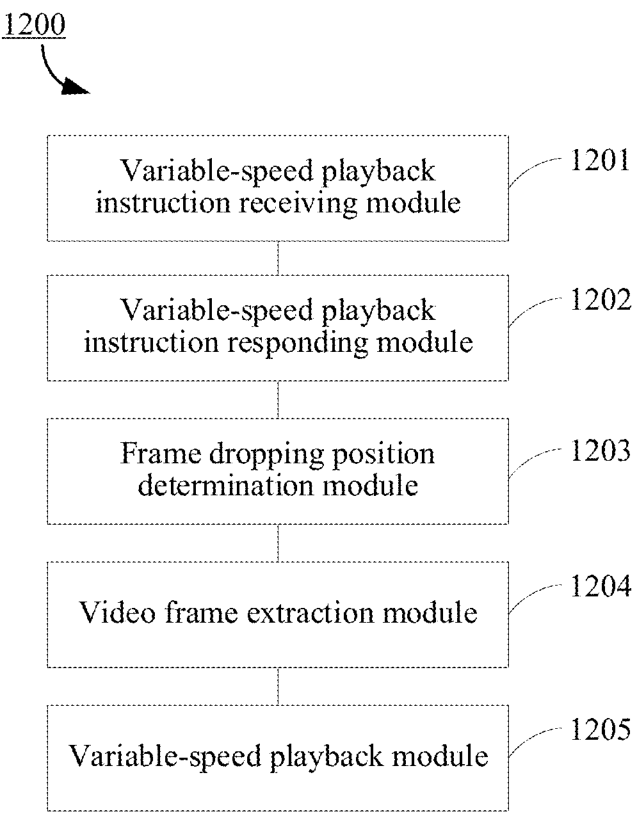
FIG. 12 is a structural block diagram of an exemplary apparatus for playing a video at variable speeds, according to some embodiments of the present disclosure.

FIG. 12 is a structural block diagram of an exemplary apparatus 1200 for playing a video at variable speeds, according to some embodiments of the present disclosure. Apparatus 1200 may include a variable-speed playback instruction receiving module 801, a variable-speed playback instruction responding module 802, a frame dropping position determination module 803, a video frame extraction module 804, and a variable-speed playback module 805.

Variable-speed playback instruction receiving module 801 includes circuitry configured to receive a variable-speed video playback instruction of a user, where the variable-speed video playback instruction includes an expected playback speed.

Variable-speed playback instruction responding module 802 includes circuitry configured to obtain an encoded image of a video sequence and obtain PTSes and non-reference frame flags of the encoded image in response to the variable-speed video playback instruction, where the encoded image has an encoding structure with time domain levels.

Frame dropping position determination module 803 includes circuitry configured to determine frame dropping positions of the video sequence based on the time domain levels, the PTSes, and the non-reference frame flags.

Video frame extraction module 804 includes circuitry configured to perform a frame extraction operation on the video sequence based on the frame dropping positions.

Variable-speed playback module 805 includes circuitry configured to perform variable-speed playback on the video sequence after the frame extraction operation at the expected playback speed.

In some embodiments, according to the apparatus for playing a video at variable speeds provided in the present disclosure, the PTSes and the non-reference frame flags of the encoded image of the video sequence may be obtained, and the frame dropping positions may be determined in combination with the PTSes and the non-reference frame flags, to perform the frame extraction operation on the video sequence based on the determined frame dropping positions, implement the level-by-level frame extraction operation on the video sequence based on the time domain levels, and perform frame dropping based on the non-reference frame flags, so that a frame dropping rate is significantly increased, an amount of computation of video processing processes such as decoding and rendering during playback of the video sequence is significantly reduced, and a processing time is reduced. In this way, a speed of fast playback and smoothness of fast playback are increased, which satisfies high requirements on a resolution and a playback frame rate under a demand for playback at various speeds.

The apparatus embodiment is substantially similar to the method embodiment, and therefore is described briefly. For related parts, refer to partial descriptions in the method embodiment.

Some embodiments of the present disclosure further provide an electronic device. The electronic device includes a processor, a memory, and a computer program stored in the memory and runnable on the processor. The computer program, when executed by the processor, implements the processes of the embodiments of the method for frame extraction processing of a video or the embodiments of the method for playing a video at variable speeds, and can implement the same technical effects. In order to avoid repetition, details are not described herein.

Some embodiments of the present disclosure further provide a computer-readable storage medium. The computer-readable storage medium stores a computer program. The computer program, when executed by a processor, implements the processes of the embodiments of the method for frame extraction processing of a video or the embodiments of the method for playing a video at variable speeds, and can implement the same technical effects. In order to avoid repetition, details are not described herein.

The embodiments may further be described using the following clauses:

1. A method for frame extraction processing of a video, comprising:

obtaining an encoded image of a video sequence;

obtaining presentation time stamps (PTSes) and non-reference frame flags of the encoded image, wherein the encoded image has an encoding structure with time domain levels;

determining frame dropping positions of the video sequence based on the time domain levels, the PTSes, and the non-reference frame flags; and performing a frame extraction operation on the video sequence based on the frame dropping positions.

2. The method according to clause 1, wherein determining the frame dropping positions of the video sequence based on the time domain levels, the PTSes, and the non-reference frame flags further comprises:

obtaining a frame sequence of the video sequence, wherein the video sequence comprises a plurality of frame sequences; and determining, by using the frame sequence as a cycle, the frame dropping positions of the video sequence based on the time domain levels, the PTSes, and the non-reference frame flags.

3. The method according to clause 2, wherein obtaining the frame sequence of the video sequence further comprises:

obtaining a start frame of the frame sequence based on the PTSes; and determining, based on the start frame and the encoding structure, a preset number of image frames located after the start frame, wherein the frame sequence includes the start frame and the preset number of image frames.

4. The method according to clause 2, wherein determining the frame dropping positions of the video sequence based on the time domain levels, the PTSes, and the non-reference frame flags further comprises:

determining, based on the encoding structure of the encoded image, time domain levels of a start frame and a plurality of image frames in the frame sequence; and determining the frame dropping positions based on the time domain levels, the PTSes, and the non-reference frame flags.

5. The method according to clause 4, wherein determining the frame dropping positions based on the time domain levels, the PTSes, and the non-reference frame flags further comprises: obtaining a first frame extraction policy based on the PTSes;

obtaining a second frame extraction policy based on the non-reference frame flags; and determining frame dropping positions of each time domain level in the frame sequence based on the first frame extraction policy and the second frame extraction policy.

6. The method according to clause 5, wherein determining the frame dropping positions of each time domain level in the frame sequence based on the first frame extraction policy and the second frame extraction policy further comprises:

determining first frame dropping positions of the frame sequence based on the time domain levels and the first frame extraction policy;

obtaining a mapping relationship for the encoded image;

mapping to-be-decoded image frames of a current time domain level based on the mapping relationship, to obtain a mapped display order, wherein the mapping relationship indicates a conversion relationship between an original display order and a decoding order of the video sequence;

determining whether the first frame dropping positions in the mapped display order satisfies a preset order; and in response to that the first frame dropping positions in the mapped display order do not satisfy the preset order, determining second frame dropping positions of the frame sequence by using the second frame extraction policy, and determine the frame dropping positions of the video sequence to be the second frame dropping positions.

7. The method according to clause 6, further comprising:

in response to that the first frame dropping positions in the mapped display order satisfy the preset order, determining the frame dropping positions of the video sequence to be the first frame dropping positions.

8. The method according to clause 6, wherein the time domain levels are ranked from a high level to a low level, and determining the first frame dropping positions of the frame sequence based on the time domain levels and the first frame extraction policy further comprises:

obtaining a plurality of groups of image frames corresponding to each time domain level, respectively; and determining the first frame dropping positions to be positions of a plurality of first target frames based on the first frame extraction policy, wherein the plurality of first target frames include one or more groups of the plurality groups of image frames.

9. The method according to clause 8, wherein determining the first frame dropping positions to be positions of a plurality of first target frames based on the first frame extraction policy further comprises:

determining a plurality of first target frames to be a group of image frames of a high-level;

determining whether performing the frame operation based on the positions the plurality of first target frames satisfies a preset frame dropping rate;

if the preset frame dropping rate is satisfied, determining the first frame dropping positions to be the positions of a plurality of first target frames; and if the preset frame dropping rate is not satisfied, updating the first target frames by adding one or more groups of the plurality of groups of image frames from high-level to low-level, gradually, until the preset frame dropping rate is satisfied.

10. The method according to clause 9, wherein the preset frame dropping rate is determined based on a decoding frame rate corresponding to an expected playback speed.

11. The method according to claim 6, wherein determining the second frame dropping positions of the frame sequences by using the second frame extraction policy further comprises: determining the second frame dropping positions of the frame sequence based on the non-reference frame flags carried in the encoded image and the second frame extraction policy.

12. The method according to clause 11, wherein determining the second frame dropping positions of the frame sequences based on the non-reference frame flags carried in the encoded image further comprises:

determining the first frame dropping positions in the mapped display order that do not satisfy the preset order as erroneous frame positions; and determining the second frame dropping positions based on the non-reference frame flags and the erroneous frame position.

13. The method according to clause 12, wherein determining the second frame dropping positions based on the non-reference frame flags and the erroneous frame positions further comprises:

obtaining one or more image frames located after the erroneous frame positions in the decoding order for the encoded image; and if the encoded image has reference frame flags or the non-reference frame flags, determining, the second frame dropping positions to be positions of image frames having the non-reference frame flags from image frames corresponding to the erroneous frame positions and the one or more image frames located after the erroneous frame positions; or if the encoded image does not carry the non-reference frame flags, skipping determining the second frame dropping positions.

14. The method according to clause 1, wherein performing the frame extraction operation on the video sequence based on the frame dropping positions further comprises:

determining target frames of the video sequence based on the frame dropping positions; and performing the frame extraction operation on the target frames, wherein the frame dropping positions comprise first frame dropping positions determined by using a first frame extraction policy for the PTSes and second frame dropping positions determined by using a second frame extraction policy for the non-reference frame flags.

15. The method according to clause 14, wherein determining the target frames of the video sequence based on the frame dropping positions further comprises:

obtaining first target frames in the video sequence located at the first frame dropping positions and second target frames in the video sequence located at the second frame dropping positions; and performing the frame extraction operation on the target frames further comprises:

performing the frame extraction operation on the first target frames and the second target frames in the video sequence.

16. The method according to any one of clauses 1 to 15, wherein the video sequence after the frame extraction operation satisfies an expected playback speed, and the method further comprises:

performing corresponding variable-speed playback on the video sequence after the frame extraction operation at the expected playback speed.

17. A method for playing a video at variable speeds, comprising:

receiving a variable-speed video playback instruction including an expected playback speed;

obtaining an encoded image of a video sequence and obtaining presentation time stamps (PTSes) and non-reference frame flags of the encoded image in response to the variable-speed video playback instruction, wherein the encoded image has an encoding structure with time domain levels;

determining frame dropping positions of the video sequence based on the time domain levels, the PTSes, and the non-reference frame flags;

performing a frame extraction operation on the video sequence based on the frame dropping positions; and performing corresponding variable-speed playback on the video sequence after the frame extraction operation at the expected playback speed.

18. An apparatus for frame extraction processing of a video, comprising:

an encoded image obtaining module including circuitry configured to obtain an encoded image of a video sequence, and obtain presentation time stamps (PTSes)

and non-reference frame flags of the encoded image, wherein the encoded image has an encoding structure with time domain levels;

a frame dropping position determination module including circuitry configured to determine frame dropping positions of the video sequence based on the time domain levels, the PTSes, and the non-reference frame flags; and a video frame extraction module including circuitry configured to perform a frame extraction operation on the video sequence based on the frame dropping positions.

19. An apparatus for playing a video at variable speeds, comprising:

a variable-speed playback instruction receiving module including circuitry configured to receive a variable-speed video playback instruction of a user, wherein the variable-speed video playback instruction comprises an expected playback speed;

a variable-speed playback instruction responding module including circuitry configured to obtain an encoded image of a video sequence and obtaining presentation time stamps (PTSes) and non-reference frame flags of the encoded image in response to the variable-speed video playback instruction, wherein the encoded image has an encoding structure with time domain levels;

a frame dropping position determination module including circuitry configured to determine frame dropping positions of the video sequence based on the time domain levels, the PTSes, and the non-reference frame flags; and a video frame extraction module including circuitry configured to perform a frame extraction operation on the video sequence based on the frame dropping positions; and a variable-speed playback module including circuitry configured to perform corresponding variable-speed playback on the video sequence after the frame extraction operation at the expected playback speed.

20. A video platform, comprising a computer program configured to be executed in the video platform, wherein the computer program, when executed by the video platform, implements the method for frame extraction processing of a video according to any one of clauses 1 to 16 or the method for playing a video at variable speeds according to clause 17.

21. A computer-readable storage medium, storing a computer program, wherein the computer program, when executed by a processor, implements the method for frame extraction processing of a video according to any of clauses 1 to 16 or the method for playing a video at variable speeds according to clause 17.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for frame extraction processing of a video, comprising:

obtaining an encoded image of a video sequence;

obtaining presentation time stamps (PTSes) and non-reference frame flags of the encoded image, wherein the encoded image has an encoding structure with time domain levels;

determining frame dropping positions of the video sequence based on the time domain levels, the PTSes, and the non-reference frame flags; and performing a frame extraction operation on the video sequence based on the frame dropping positions.

2. The method according to claim 1, wherein determining the frame dropping positions of the video sequence based on the time domain levels, the PTSes, and the non-reference frame flags further comprises:

obtaining a frame sequence of the video sequence, wherein the video sequence comprises a plurality of frame sequences; and determining, by using the frame sequence as a cycle, the frame dropping positions of the video sequence based on the time domain levels, the PTSes, and the non-reference frame flags.

3. The method according to claim 2, wherein obtaining the frame sequence of the video sequence further comprises:

obtaining a start frame of the frame sequence based on the PTSes; and determining, based on the start frame and the encoding structure, a preset number of image frames located after the start frame, wherein the frame sequence includes the start frame and the preset number of image frames.

4. The method according to claim 2, wherein determining the frame dropping positions of the video sequence based on the time domain levels, the PTSes, and the non-reference frame flags further comprises:

determining, based on the encoding structure of the encoded image, time domain levels of a start frame and a plurality of image frames in the frame sequence; and determining the frame dropping positions based on the time domain levels, the PTSes, and the non-reference frame flags.

5. The method according to claim 4, wherein determining the frame dropping positions based on the time domain levels, the PTSes, and the non-reference frame flags further comprises:

obtaining a first frame extraction policy based on the PTSes;

obtaining a second frame extraction policy based on the non-reference frame flags; and determining frame dropping positions of each time domain level in the frame sequence based on the first frame extraction policy and the second frame extraction policy.

6. The method according to claim 5, wherein determining the frame dropping positions of each time domain level in the frame sequence based on the first frame extraction policy and the second frame extraction policy further comprises:

determining first frame dropping positions of the frame sequence based on the time domain levels and the first frame extraction policy;

obtaining a mapping relationship for the encoded image;

mapping to-be-decoded image frames of a current time domain level based on the mapping relationship, to obtain a mapped display order, wherein the mapping relationship indicates a conversion relationship between an original display order and a decoding order of the video sequence;

determining whether the first frame dropping positions in the mapped display order satisfies a preset order; and in response to that the first frame dropping positions in the mapped display order do not satisfy the preset order, determining second frame dropping positions of the frame sequence by using the second frame extraction policy, and determining the frame dropping positions of the video sequence to be the second frame dropping positions.

7. The method according to claim 6, further comprising:

in response to that the first frame dropping positions in the mapped display order satisfy the preset order, determining the frame dropping positions of the video sequence to be the first frame dropping positions.

8. The method according to claim 6, wherein the time domain levels are ranked from a high level to a low level, and determining the first frame dropping positions of the frame sequence based on the time domain levels and the first frame extraction policy further comprises:

obtaining a plurality of groups of image frames corresponding to each time domain level, respectively; and determining the first frame dropping positions to be positions of a plurality of first target frames based on the first frame extraction policy, wherein the plurality of first target frames include one or more groups of the plurality groups of image frames.

9. The method according to claim 8, wherein determining the first frame dropping positions to be positions of a plurality of first target frames based on the first frame extraction policy further comprises:

determining a plurality of first target frames to be a group of image frames of a high-level;

determining whether performing the frame operation based on the positions the plurality of first target frames satisfies a preset frame dropping rate;

if the preset frame dropping rate is satisfied, determining the first frame dropping positions to be the positions of a plurality of first target frames; or if the preset frame dropping rate is not satisfied, updating the first target frames by adding one or more groups of the plurality of groups of image frames from high-level to low-level, gradually, until the preset frame dropping rate is satisfied.

10. The method according to claim 9, wherein the preset frame dropping rate is determined based on a decoding frame rate corresponding to an expected playback speed.

11. The method according to claim 6, wherein determining the second frame dropping positions of the frame sequences by using the second frame extraction policy further comprises:

determining the second frame dropping positions of the frame sequence based on the non-reference frame flags carried in the encoded image and the second frame extraction policy.

12. The method according to claim 11, wherein determining the second frame dropping positions of the frame sequences based on the non-reference frame flags carried in the encoded image further comprises:

determining the first frame dropping positions in the mapped display order that do not satisfy the preset order as erroneous frame positions; and determining the second frame dropping positions based on the non-reference frame flags and the erroneous frame position.

13. The method according to claim 12, wherein determining the second frame dropping positions based on the non-reference frame flags and the erroneous frame positions further comprises:

obtaining one or more image frames located after the erroneous frame positions in the decoding order for the encoded image;

if the encoded image has reference frame flags or the non-reference frame flags, determining, the second frame dropping positions to be positions of image frames having the non-reference frame flags from image frames corresponding to the erroneous frame positions and the one or more image frames located after the erroneous frame positions; or if the encoded image does not carry the non-reference frame flags, skipping determining the second frame dropping positions.

14. The method according to claim 1, wherein performing the frame extraction operation on the video sequence based on the frame dropping positions further comprises:

determining target frames of the video sequence based on the frame dropping positions; and performing the frame extraction operation on the target frames, wherein the frame dropping positions comprise first frame dropping positions determined by using a first frame extraction policy for the PTSes and second frame dropping positions determined by using a second frame extraction policy for the non-reference frame flags.

15. The method according to claim 14, wherein determining the target frames of the video sequence based on the frame dropping positions further comprises:

obtaining first target frames in the video sequence located at the first frame dropping positions and second target frames in the video sequence located at the second frame dropping positions; and performing the frame extraction operation on the target frames further comprises:

performing the frame extraction operation on the first target frames and the second target frames in the video sequence.

16. The method according to claim 1, wherein the video sequence after the frame extraction operation satisfies an expected playback speed, and the method further comprises:

performing corresponding variable-speed playback on the video sequence after the frame extraction operation at the expected playback speed.

17. A method for playing a video at variable speeds, comprising:

receiving a variable-speed video playback instruction including an expected playback speed;

obtaining an encoded image of a video sequence and obtaining presentation time stamps (PTSes) and non-reference frame flags of the encoded image in response to the variable-speed video playback instruction, wherein the encoded image has an encoding structure with time domain levels;

determining frame dropping positions of the video sequence based on the time domain levels, the PTSes, and the non-reference frame flags;

performing a frame extraction operation on the video sequence based on the frame dropping positions; and performing corresponding variable-speed playback on the video sequence after the frame extraction operation at the expected playback speed.

18. A video platform, comprising:

a memory configured to store instructions; and one or more processors configured to execute the instructions to cause the video platform to perform operations for frame extraction processing of a video, wherein the operations comprise:

obtaining an encoded image of a video sequence;

obtaining presentation time stamps (PTSes) and non-reference frame flags of the encoded image, wherein the encoded image has an encoding structure with time domain levels;

determining frame dropping positions of the video sequence based on the time domain levels, the PTSes, and the non-reference frame flags; and performing a frame extraction operation on the video sequence based on the frame dropping positions.

19. The video platform according to claim 18, wherein the video sequence after the frame extraction operation satisfies an expected playback speed, and the operations further comprise:

performing corresponding variable-speed playback on the video sequence after the frame extraction operation at the expected playback speed.

20. A non-transitory computer readable medium that stores a set of instructions that is executable by one or more processors of a video platform to cause the video platform to perform operations for frame extraction processing of a video, wherein the operations comprise:

obtaining an encoded image of a video sequence;

obtaining presentation time stamps (PTSes) and non-reference frame flags of the encoded image, wherein the encoded image has an encoding structure with time domain levels;

determining frame dropping positions of the video sequence based on the time domain levels, the PTSes, and the non-reference frame flags; and performing a frame extraction operation on the video sequence based on the frame dropping positions.

* * * * *